(12) United States Patent
Stamoulis et al.

(10) Patent No.: US 8,599,748 B2
(45) Date of Patent: Dec. 3, 2013

(54) ADAPTING DECISION PARAMETER FOR REACTING TO RESOURCE UTILIZATION MESSAGES

(75) Inventors: Anastasios Stamoulis, San Diego, CA (US); Ashwin Sampath, Princeton, NJ (US); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 754 days.

(21) Appl. No.: 12/055,148

(22) Filed: Mar. 25, 2008

(65) Prior Publication Data

US 2009/0247177 A1 Oct. 1, 2009

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 6,621,805 B1 | 9/2003 | Kondylis et al. | |
| 7,453,903 B2 * | 11/2008 | Chinitz | 370/455 |
| 7,466,983 B2 * | 12/2008 | Hoff et al. | 370/235.1 |
| 7,546,136 B2 | 6/2009 | Lindoff | |
| 7,725,577 B2 * | 5/2010 | Nochta et al. | 370/252 |
| 2006/0088021 A1 | 4/2006 | Nelson et al. | |
| 2007/0105573 A1 | 5/2007 | Gupta et al. | |
| 2007/0105574 A1 * | 5/2007 | Gupta et al. | 455/509 |
| 2007/0105575 A1 * | 5/2007 | Sampath et al. | 455/509 |
| 2007/0105581 A1 | 5/2007 | Ariyur | |
| 2007/0115817 A1 * | 5/2007 | Gupta et al. | 370/230 |
| 2007/0274280 A1 | 11/2007 | Haas et al. | |
| 2007/0280116 A1 | 12/2007 | Wang et al. | |
| 2008/0031224 A1 | 2/2008 | Nanda et al. | |
| 2008/0095036 A1 | 4/2008 | Gorokhov et al. | |
| 2008/0298248 A1 * | 12/2008 | Roeck et al. | 370/237 |
| 2009/0017861 A1 | 1/2009 | Wu et al. | |
| 2009/0023466 A1 | 1/2009 | Sutivong et al. | |
| 2009/0228598 A1 | 9/2009 | Stamoulis et al. | |
| 2009/0245182 A1 | 10/2009 | Abraham et al. | |
| 2010/0069107 A1 | 3/2010 | Mese et al. | |
| 2010/0211540 A9 | 8/2010 | Das et al. | |

FOREIGN PATENT DOCUMENTS

| | | |
|---|---|---|
| CN | 101091324 | 12/2007 |
| CN | 101091400 | 12/2007 |
| JP | 2009514441 | 4/2009 |
| JP | 2009514443 | 4/2009 |

(Continued)

OTHER PUBLICATIONS

International Search Report and Written Opinion—PCT/US2008/058517—ISA/EPO—Feb. 4, 2009.

(Continued)

*Primary Examiner* — Anh-Vu Ly
(74) *Attorney, Agent, or Firm* — Nicholas J. Pauley; Peter Michael Kamarchik; Joseph Agusta

(57) ABSTRACT

An adaptable decision parameter is used to determine whether to react to resource utilization messages. The decision parameter may comprise a decision threshold that is adapted based on received resource utilization messages. The decision parameter may comprise a probability that is used to determine whether to react to a received resource utilization message. Such a probability may be based on, for example, one or more channel conditions, the number of interferers seen by a node, the number of received resource utilization messages, or some other form of resource utilization message-related information.

76 Claims, 13 Drawing Sheets

(56) References Cited

FOREIGN PATENT DOCUMENTS

| JP | 2009514444 | 4/2009 |
| JP | 2009514445 | 4/2009 |
| WO | WO0120810 A1 | 3/2001 |
| WO | WO2005074356 | 8/2005 |
| WO | WO2005125227 | 12/2005 |
| WO | WO2006044291 | 4/2006 |
| WO | 2007051140 | 5/2007 |
| WO | WO2007051153 | 5/2007 |
| WO | WO2007078160 | 7/2007 |

OTHER PUBLICATIONS

International Search Report and Written Opinion—PCT/US2008/058520—ISA/EPO—Feb. 2, 2009.

Taiwan Search Report—TW097118415—TIPO—Aug. 4, 2012.

* cited by examiner

ADAPTING DECISION PARAMETER FOR REACTING TO RESOURCE UTILIZATION MESSAGES

CROSS-REFERENCE TO RELATED APPLICATION

This application is related to concurrently filed and commonly owned U.S. patent application entitled "ADAPTIVELY REACTING TO RESOURCE UTILIZATION MESSAGES INCLUDING CHANNEL GAIN INDICATION," and assigned 12/055196 the disclosure of which is hereby incorporated by reference herein.

BACKGROUND

1. Field

This application relates generally to wireless communication and more specifically, but not exclusively, to adaptively reacting to communication messages.

2. Introduction

Deployment of a wireless communication system typically involves implementing some form of interference mitigation scheme. In some wireless communication systems, interference may be caused by neighboring wireless nodes. As an example, in a cellular system wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U. S. Patent Application Publication No. 2007/0105574, the disclosure of which is hereby incorporated by reference, describes a system where fair-sharing of a wireless channel may be facilitated by joint scheduling of a transmission by transmitting and receiving nodes through the use of a resource utilization message. Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a resource utilization message in an attempt to cause the neighboring transmitting nodes to limit their interfering transmissions. According to related aspects, a resource utilization message may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a resource utilization message may utilize the fact that it has received a resource utilization message, as well as the weight thereof, to determine an appropriate response. For example, the transmitting node may elect to abstain from transmitting, may reduce its transmit power during one or more designated timeslots, may ignore the resource utilization message, or may respond in some other manner. The advertisement of the resource utilization messages and associated weights may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to determining whether to react to a resource utilization message (hereafter referred to as a "RUM" for convenience). For example, a first communication node may receive a RUM that indicates that a second communication node (i.e., the RUM-sending node) wishes to use a communication resource during an upcoming transmission opportunity. The first node (e.g., a potential interfering node) may then determine whether it will take any action in response to the received message. For example, the first node may elect to ignore the message or obey the message. Here, obeying the message may involve limiting transmission in some manner during the transmission opportunity. For example, the first node may limit transmission by abstaining from transmitting, reducing transmit power, transmitting on another resource, or taking some other suitable action.

In some aspects the manner in which a node determines whether to react to a RUM may be adaptable. For example, a decision by a node to react or not react to a RUM may be based on an adaptable decision parameter such as a RUM rejection threshold or a probability parameter. In these cases, adapting a decision parameter may thus involve increasing or decreasing the RUM rejection threshold or the probability parameter.

In some aspects, a decision parameter may be adapted based on one or more received RUMs. For example, the decision parameter may be adapted based on how many RUM have been received, information included in a RUM, or a combination thereof. Information included in a RUM may comprise a priority (e.g., a weight) associated with the RUM, a channel condition associated with the RUM-sending node, an indication relating to the number of interferers seen by the RUM-sending node, or some other type of information.

As an example, a RUM rejection threshold may be decreased in response to an increase in the number of RUMs received by a node and/or in response to an increase in the weight of the received RUMs. By decreasing the threshold in this way, an interfering node may be configured to react to (e.g., obey) more RUMs.

As another example, a probability parameter may be defined based on the condition of a channel on which a RUM-sending node receives data from an associated transmitting node. In this case, a potential interferer (i.e., an interfering node) may set its probability of obeying a RUM from the RUM-sending node to a relatively low value if the RUM-sending node has a relatively good channel to its associated transmitting node. As a result, the interferer may obey RUMs from the RUM-sending node at a relatively infrequent rate since it is more likely in this case that the transmission from the interferer will not significantly interfere with the reception at the RUM-sending node on that channel. Conversely, the probability of obeying a RUM may be set to a relatively high value if the RUM-sending node has a relatively poor channel to its associated transmitting node. In this case, the interferer may obey more of the RUMs from the RUM-sending node since it is more likely that a transmission from the interferer will interfere with reception at the RUM-sending node under these circumstances.

A probability parameter may be adapted based on various types of information in addition to the above channel condition information. For example, the probability of obeying a RUM may be defined to be inversely proportional to the estimated power level (e.g., power spectral density) of an interfering signal at the RUM-sending node. In addition, the probability of obeying a RUM from a given node may be decreased in the event the interferer has recently obeyed a large number of RUMs from that node.

BRIEF DESCRIPTION OF THE DRAWINGS

These and other sample aspects of the disclosure will be described in the detailed description and the appended claims that follow, and in the accompanying drawings, wherein:

Figure 1:
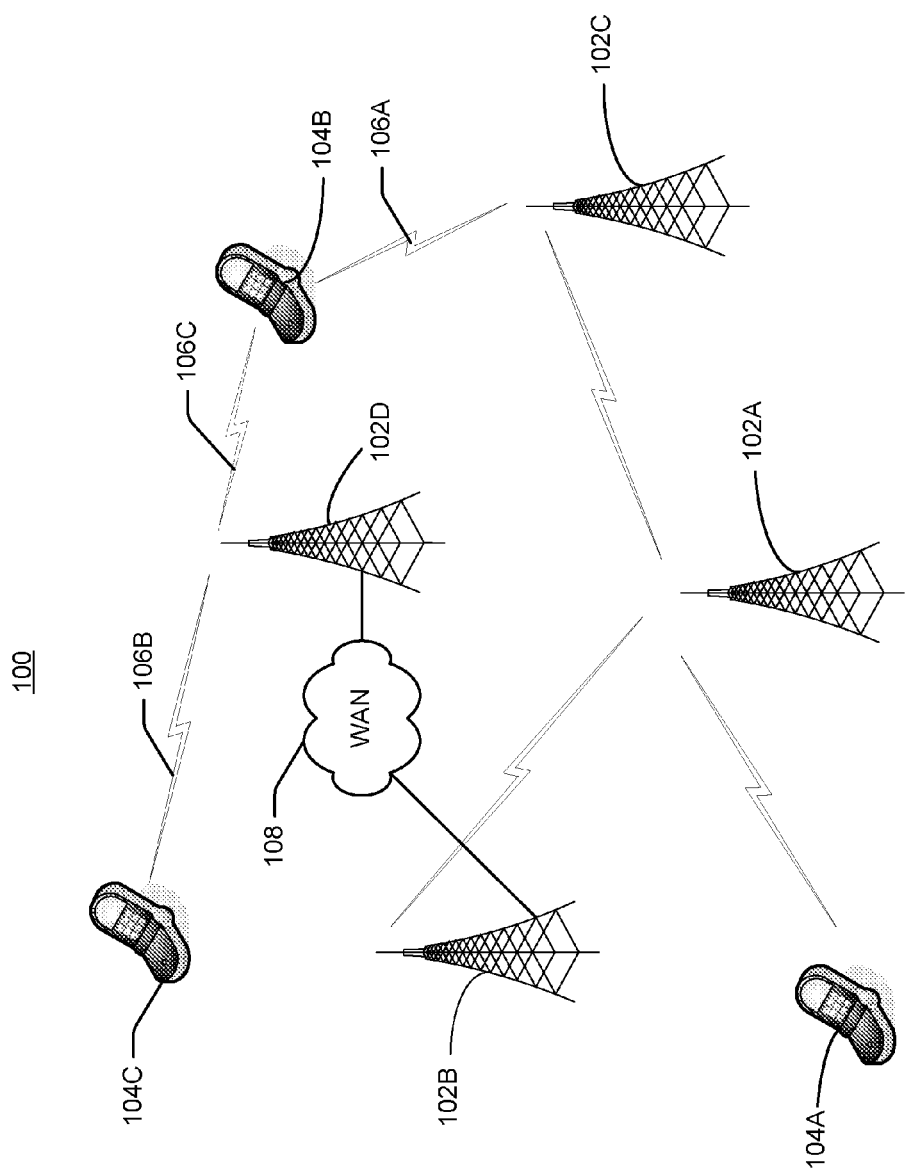
FIG. 1 is a simplified diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises receiving a set of RUMs, and adapting, based on the received set of RUMs, a decision parameter that is used to determine whether to react to at least one received RUM. In addition, in some aspects the decision parameter comprises a RUM rejection threshold and in some aspects the decision parameter comprises a probability of reacting to the at least one received RUM.

For illustration purposes, the discussion that follows describes various nodes, components, and operations of a wireless system where an access point communicates with one or more access terminals. It should be appreciated that the teachings herein also may be applicable to other types of nodes, devices, and communication systems (e.g., wireless or non-wireless systems).

FIG. 1 illustrates several sample aspects of a wireless communication system 100. The system 100 includes several wireless nodes, generally designated as wireless nodes 102 and 104. A given wireless node may receive and/or transmit one or more traffic flows (e.g., data flows). For example, each wireless node may comprise at least one antenna and associated receiver and transmitter components. In the discussion that follows the term receiving node may be used to refer to a wireless node that is receiving and the term transmitting node may be used to refer to a wireless node that is transmitting. Such a reference does not imply that the wireless node is incapable of performing both transmit and receive operations.

A wireless node may be implemented in various ways. For example, in some implementations a wireless node may comprise an access terminal, a relay point, or an access point. Referring to FIG. 1, the wireless nodes 102 may comprise access points or relay points and the wireless nodes 104 may comprise access terminals. In some implementations the wireless nodes 102 facilitate communication between the wireless nodes of a network (e.g., a Wi-Fi network, a cellular network, or a WiMAX network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the wireless nodes (e.g., wireless nodes 102B and 102D) may comprise a wired access point that provides connectivity to another network or networks (e.g., a wide area network 108 such as the Internet).

In some aspects two or more wireless nodes of the system 100 (e.g., wireless nodes of a common independent service set) associate with one another to establish traffic flows between the wireless nodes via one or more communication links. For example, the wireless nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some cases, several wireless nodes in the system 100 may attempt to transmit at the same time (e.g., during the same timeslot). Depending on the relative locations of the transmitting and receiving nodes and the transmit power of the transmitting nodes, it may be possible to reliably conduct such concurrent communications. Under these circumstances, the wireless resources of the system 100 may be well utilized as compared to, for example, a system that simply uses a carrier sense multiple access ("CSMA") mode of operation.

Under other circumstances, however, wireless transmissions from a node in the system 100 may interfere with reception at another wireless node in the system 100 (e.g., a non-associated node of another communication sector). For example, the wireless node 104B may be receiving from the wireless node 102C (as represented by a wireless communication symbol 106A) at the same time that a wireless node 102D is transmitting to a wireless node 104C (as represented by a symbol 106B). Depending on the distance between the wireless nodes 104B and 102D and the transmission power of the wireless node 102D, transmissions from the wireless node 102D (as represented by a dashed symbol 106C) may interfere with reception at the wireless node 104B. In a similar manner, transmissions from the wireless node 104B may interfere with reception at the wireless node 102D depending on the transmission power of the wireless node 104B.

To mitigate interference such as this, the nodes of a wireless communication system may employ an inter-node messaging scheme. For example, a receiving node that wishes to reduce the likelihood of interference may transmit a RUM to indicate that this receiving node is requesting priority access to a given resource (e.g., because reception at the node is disadvantaged in some way). A neighboring wireless node that receives the RUM (e.g., a potential interferer) may elect to limit its future transmissions in some way to avoid interfering with reception at the RUM-sending node (i.e., the receiving node that sent the RUM). Here, a decision by a receiving node to transmit a RUM may be based, at least in part, on quality of service associated with data received at that receiving node. For example, a receiving node may transmit a RUM in the event the current level of quality of service for one or more of its links or flows falls below a desired quality of service level. Conversely, the receiving node may not transmit a RUM if the quality of service is acceptable.

Sample RUM-related operations of a system such as the system 100 will now be discussed in more detail in conjunction with the flowchart of FIG. 2. For convenience, the operations of FIG. 2 (or any other operations discussed or taught herein) may be described as being performed by specific components (e.g., components of a system 300 as depicted in FIG. 3). It should be appreciated, however, that these operations may be performed by other types of components and may be performed using a different number of components. It also should be appreciated that one or more of the operations described herein may not be employed in a given implementation.

Figure 2:
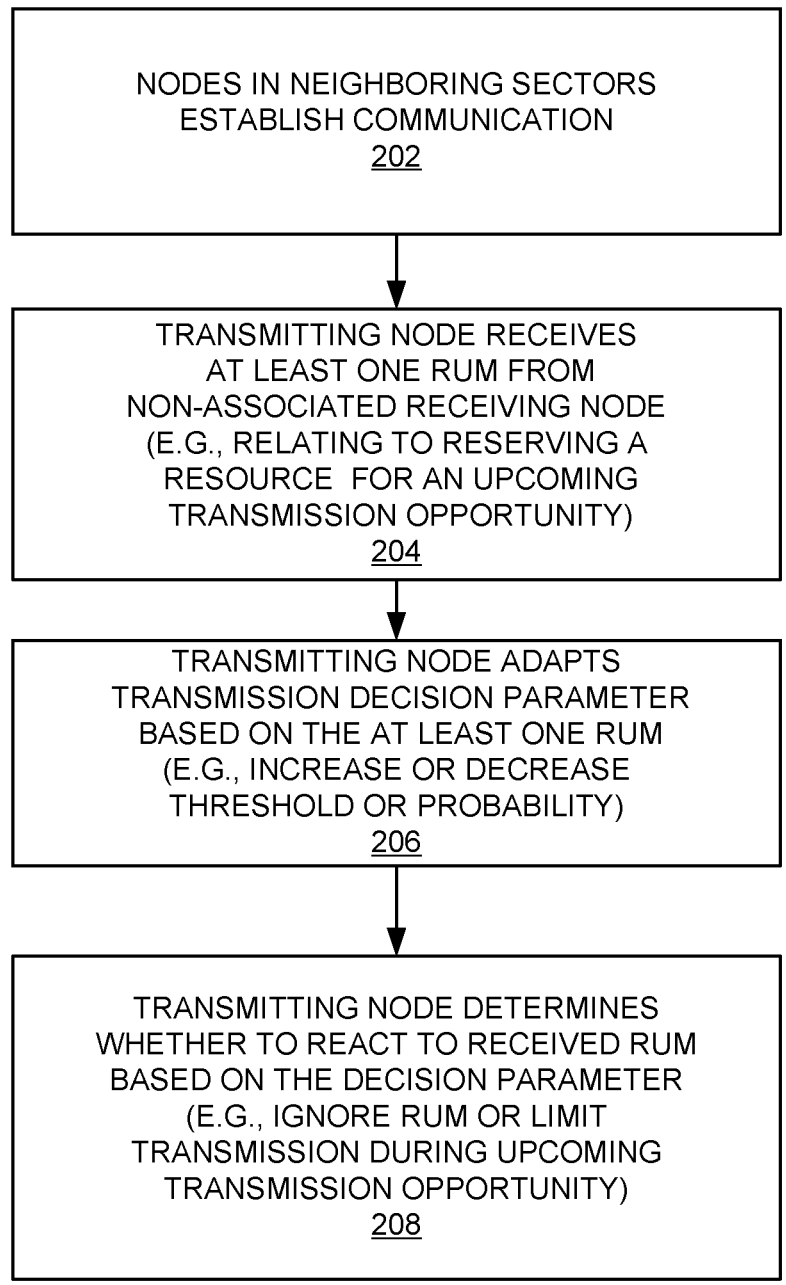
FIG. 2 is a flowchart of several sample aspects of operations that may be performed to adapt how a node reacts to received resource utilization messages.
Figure 3:
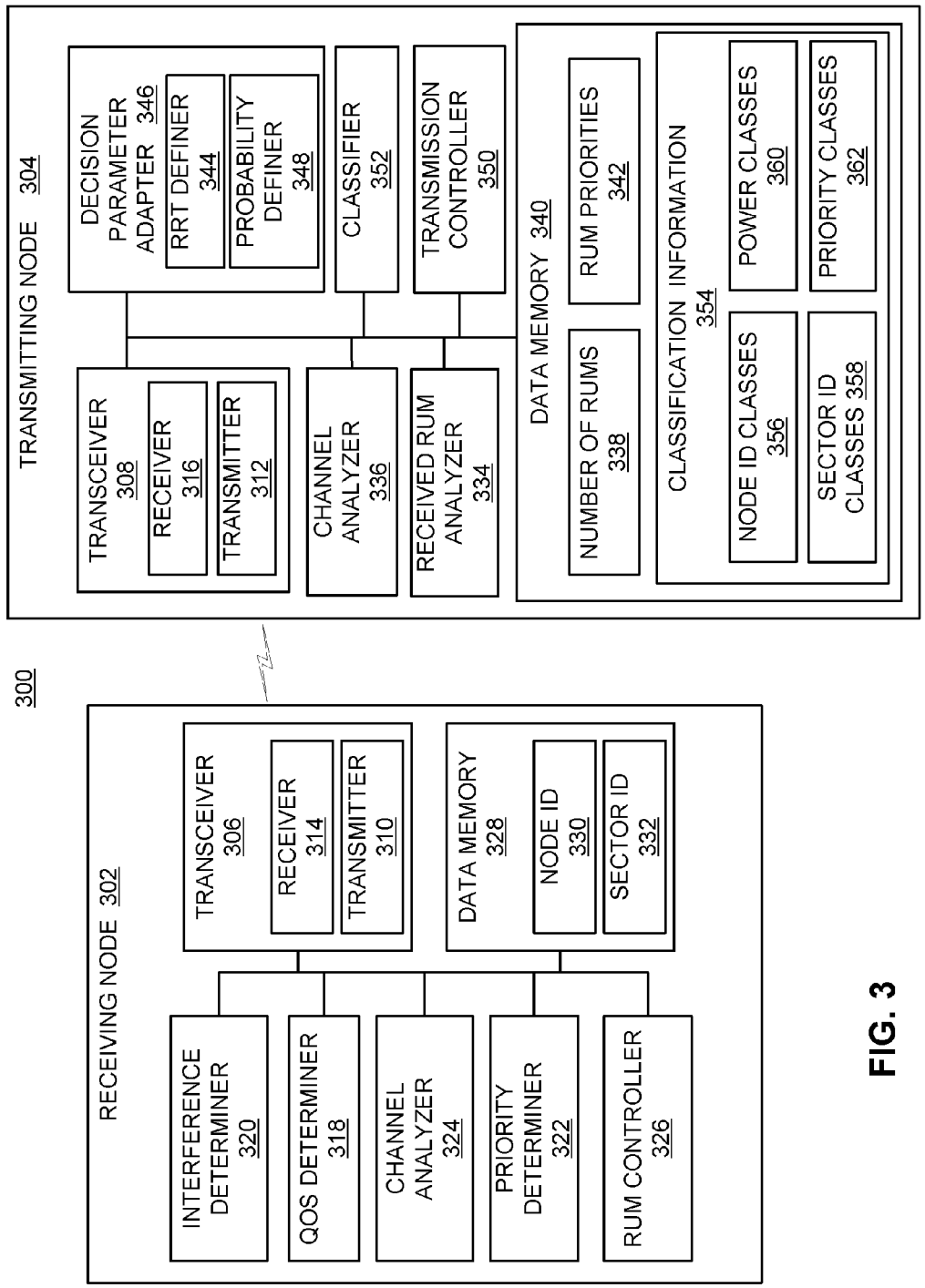
FIG. 3 is a simplified block diagram of several sample aspects of a communication system employing components configured to provide functionality relating to adapting reactions to received resource utilization messages.

As represented by block 202 of FIG. 2, when a wireless node is within communication range of another wireless node, the nodes may associate with one another to establish a communication session. Moreover, different sets of nodes may associate with one another in a given neighborhood. For example, one set of nodes (e.g., associated with an access point 102C in FIG. 1) may form one communication sector while another set of nodes (e.g., associated with an access point 102D) may form a neighboring sector. Consequently, one or more traffic flows may be established in the first sector from a transmitting node (e.g., node 102C) to an associated receiving node (e.g., node 104B). In addition, one or more traffic flows may be established in the second sector from a transmitting node (e.g., node 102D) to an associated receiving node (e.g., node 104C).

As represented by block 204, at some point in time a transmitting node (e.g., node 102D) may receive one or more RUMs from one or more receiving nodes (e.g., form non-associated node 104B). Here, a receiving node may send a RUM in an attempt to reserve a resource for an upcoming transmission opportunity. For example, the receiving node 104B may repeatedly (e.g., continually, periodically, etc.) monitor the quality of service associated with data it receives from an associated transmitting node (e.g., node 102C). In the event the monitored quality of service falls below a desired quality of service level (e.g., due to interference from a non-associated transmitting node 102D), the receiving node 104B may transmit a RUM in an attempt to reserve a resource and thereby improve the quality of service of its received data.

As represented by block 206, the transmitting node may adapt a transmission decision parameter based on one or more of the received RUMs. A decision parameter may take various forms. For example, in some cases a decision parameter may comprise a RUM rejection threshold, while in other cases a decision parameter may comprise a probability. Hence, adapting the decision parameter may involve raising or lowering a RUM rejection threshold or increasing or decreasing a probability value. Sample operations relating to a scenario where the adaptable decision parameter comprises a RUM rejection threshold are described below in conjunction with FIGS. 5 and 6. Sample operations relating to a scenario where the adaptable decision parameter comprises a probability are described below in conjunction with FIGS. 7A-9B.

As will be discussed in more detail below, a decision parameter may be adapted based on a RUM itself (e.g., the mere receipt of a RUM) and/or based on information included in a RUM. Also, a decision parameter may be adapted based a current RUM, one or more previously received RUMs, or a current RUM and one or more previously received RUMs. For example, in some cases a decision parameter may be based on the number of RUMs that are received during a given period of time. In some cases a RUM may comprise priority information whereby the decision parameter may be based on this priority information. In some cases a RUM may include an indication of the condition of a channel between a RUM-sending node and its associated transmitting node, whereby the decision parameter may be based on this indication. In some cases a RUM may comprise an indication relating to how many interfering nodes are seen by the RUM-sending node, whereby the decision parameter may be based on this indication. In some cases the decision parameter may be based on the number of received RUMs that were obeyed.

As represented by block 208 of FIG. 2, the transmitting node uses the decision parameter to determine whether to react to a received RUM. As mentioned above, a decision to ignore a RUM or limit transmission in response to a received RUM may be based on, for example, comparison of information derived from the received RUM with a RUM rejection threshold or based on a probability that is, in turn, based on information associated with the received RUM. In addition, in some aspects such a decision may be based on a combination of factors (e.g., according to a hierarchy that defines an order in which the factors are considered). For example, as a first step, information may be compared with the RUM rejection threshold. In a second step, a probability based on information (e.g., a channel gain) received via the RUM may be employed. In a third step, a probability based on receipt of one or more RUMs (e.g., the number of received RUMS) may be employed.

A transmitting node may limit its transmission in various ways. For example, a node may limit transmission by abstaining from transmitting during a transmission opportunity (e.g., delaying transmission by electing to transmit during a later timeslot), reducing transmit power, reducing data transmission rate, using different coding, transmitting on another resource (e.g., using a different frequency carrier), performing some other suitable operation, or performing some combination or the above.

With the above overview in mind, various aspects of RUM-related operations and representative components that may perform these operations will now be described in more detail in conjunction with FIGS. 3-9B.

FIG. 3 illustrates sample components of a receiving node 302 and a non-associated transmitting node 304 that are close enough to one another such that transmissions from the node 304 may interference with reception at the node 302. Thus, the node 304 may be an interfering node to the node 302 and, as a result of this interference, the node 302 may be a RUM-sending node. The nodes 302 and 304 include transceivers 306 and 308, respectively, for communicating with other nodes. The transceivers 306 and 308 respectively include transmitters 310 and 312 and receivers 314 and 316. Other components of the nodes 302 and 304 will be described in conjunction with the discussion of FIGS. 4-9B that follows.

Figure 4:
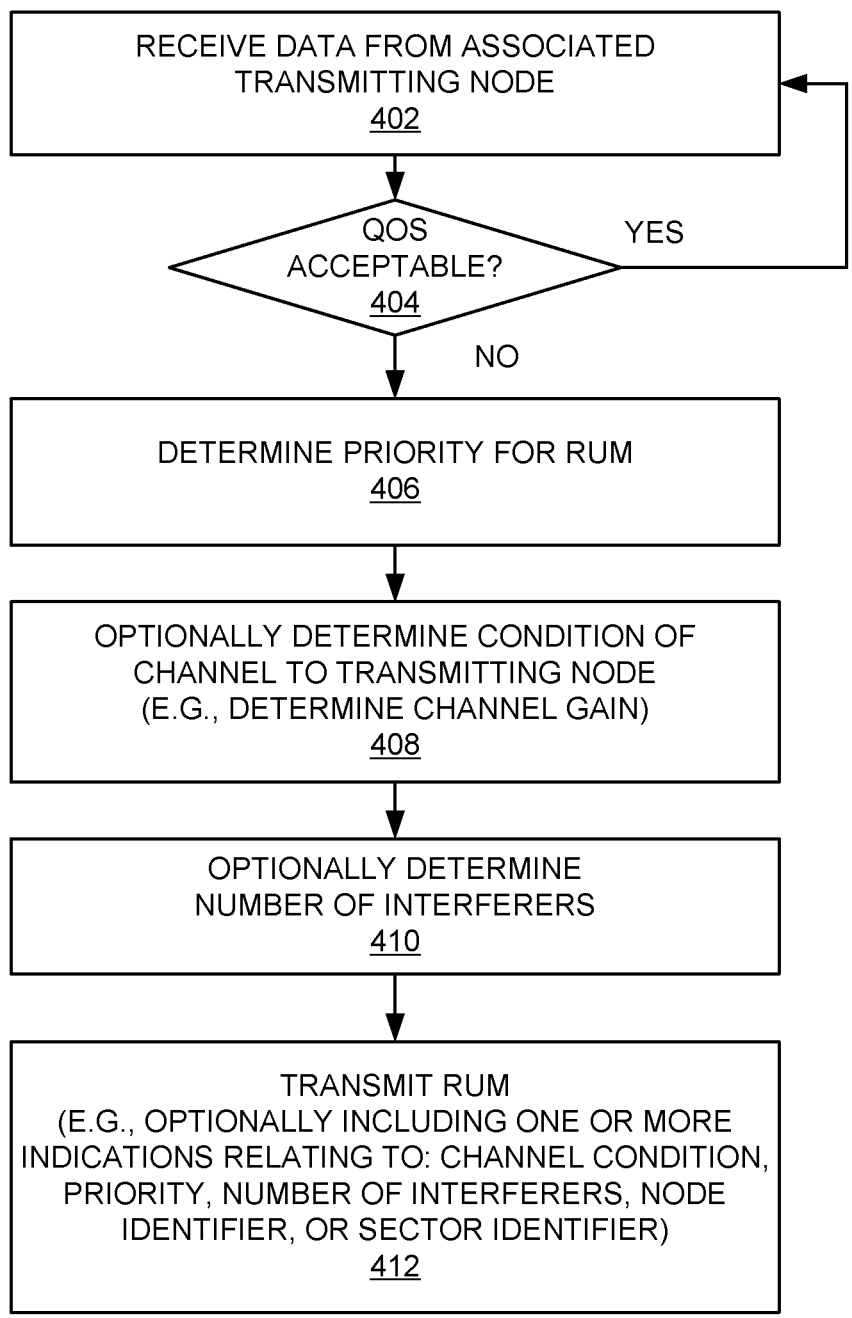
FIG. 4 is a flowchart of several sample aspects of operations that may be performed to provide a RUM.

FIG. 4 describes sample operations that the receiving node 302 (e.g., an access point or access terminal) may perform in conjunction with receiving data and generating RUMs. As represented by block 402, the receiving node 302 (e.g., node 104B of FIG. 1) receives data from an associated transmitting node (e.g., node 102C).

As represented by block 404, the receiving node 302 may determine whether it is receiving data (e.g., one or more flows) in accordance with a desired level of quality of service ("QoS"). Here, a desired level of quality of service may relate to throughput (e.g., for full buffer traffic), latency (e.g., for voice traffic), average spectral efficiency, minimum carrier-to-interference ratio ("C/I"), or some other suitable metrics or metrics. For example, it may be desirable for a node to receive data associated with a given type of traffic at or above a given throughput rate (e.g., for video traffic), within a given latency period (e.g., for voice traffic), or without significant interference.

In the example of FIG. 3, the receiving node 302 includes a QoS determiner 318 configured to analyze data received by the receiver 314 to determine one or more quality of service-related parameters associated with the data. Accordingly, the QoS determiner 318 may calculate throughput of received data and/or calculate latency of received data. In addition, the QoS determiner 318 may cooperate with an interference determiner 320 to obtain, for example, an estimate of the amount of interference imparted on the received data. It should be appreciated that a QoS determiner may take other forms and that various techniques may be employed to monitor quality of service. For example, in some implementations a node may employ a sliding window scheme (e.g., a short term moving average) to monitor the level of quality of service of its received data on a relatively continual basis.

In some aspects, a determination of whether a given level of quality of service is being achieved may be based on comparison of the quality of service information provided by the QoS determiner 318 with information representative of a desired quality of service (e.g., a quality of service threshold). For example, the QoS determiner 318 may generate a quality of service metric that indicates (e.g., provides an estimate of) the level of quality of service that is associated with received data over a given time period, a given number of packets, and so on. In addition, one or more thresholds (e.g., a RUM sending threshold) may define an expected quality of service level for a given type of traffic or for several different types of traffic. The QoS determiner 318 may thus compare the current quality of service metric with a quality of service threshold to determine whether the desired quality of service is being met at block 404. If so, the receiving node 302 may continue receiving data and monitoring the associated quality of service as represented by the arrow from block 404 to block 402 in FIG. 4.

On the other hand, if the quality of service is not acceptable at block 404, the receiving node 302 may attempt to reserve a resource to improve the quality of service for its received data (e.g., to reduce interference on the resource the node 302 will use to receive data). Blocks 406-412 describe several operations that the receiving node 302 may perform in conjunction with generating and transmitting a RUM.

As represented by block 406, the receiving node 302 (e.g., a priority determiner 322) may determine a RUM priority that indicates, for example, the degree to which the receiving node 302 is disadvantaged. Priority information associated with a RUM may take various forms. For example, in some cases priority information may take the form of a weighting factor (e.g., a weight indication that is included in the RUM). In some implementations a RUM weight may be defined as a quantized value of a ratio of the desired quality of service (e.g., corresponding to a RUM-sending threshold) and a quality of service metric relating to the quality of service that is actually achieved. Such a weighting factor may be normalized to reduce the overhead of the weighting factor. For example, a weight may be represented by a few bits (e.g., two or three bits). In some cases, priority may be indicated by the ordering of RUMs (e.g., in time and/or frequency). For example, RUMs occurring earlier in time may be associated with a higher priority.

As represented by block 408, the receiving node 302 may optionally determine the condition of a channel to an associated transmitting node. For example, a channel analyzer 324 may cooperate with the transceiver 306 to process signals received via the channel and thereby determine one or more channel characteristics such as channel gain (e.g., corresponding to path loss of the channel). As will be described in more detail below, this information may be used by an interfering node to determine whether to react to a RUM that was sent in an attempt to reserve a resource that includes that channel.

As represented by block 410, the receiving node 302 may optionally determine the number of interferers that are affecting reception of data at the node 302. As will be described in more detail below, this information may be used to generate an indication that is broadcast by the node 302 whereby nearby interfering nodes may determine whether to react to a RUM based on the indication.

The number of interferers may be determined in various ways. For example, in some cases, the interference determiner 320 may cooperate with the transceiver 306 to process signals received on a given channel to determine the number of non-associated transmitting nodes that are transmitting on that channel. In some cases, the existence of one or more interfering nodes may be identified based on a degradation in quality of service of received data (e.g., as evidenced by an increased data error rate), a lower signal-to-noise ratio on a given channel, or some other condition.

As represented by block 412, the receiving node 302 (e.g., a RUM controller 326) generates RUM information and transmits (e.g., broadcasts) the RUM in cooperation with the transceiver 306. The RUM may include one more indications relating to the information described above on conjunction with blocks 406-410 (e.g., a priority indication, a channel condition indication, and an indication relating to the number of interferers). In addition, in some cases a RUM may include other information maintained by the node 302 (e.g., in a data memory 328) such as a node identifier ("ID") 330 or a sector identifier 332 (e.g., identifying a particular base station or SSID). Also, in some cases the node 302 may convey information by the manner in which a RUM is transmitted. For example, as mentioned above, the timing and/or frequency characteristics of a RUM may indicate priority of that RUM.

In some aspects a RUM may be used to mitigate (e.g., clear) interference on one or more carriers. For example, in some cases each RUM relates to a single carrier (e.g., that is associated with a given frequency band). Here, whenever a wireless node wishes to clear interference on that carrier, the wireless node may transmit a RUM (e.g., via a time-division and/or frequency-division multiplexed control channel). In other cases, each RUM may relate to a set of carriers. For example, in some multi-carrier systems a wireless node may transmit a RUM whenever it wishes to clear interference on all of the carriers. In other multi-carrier systems a RUM may be clear a subset of the available carriers. For example, when a wireless node wishes to clear interference on a subset of the carriers, the wireless node may transmit a RUM in conjunction with an indication of the carrier(s) to which the RUM applies. In such a case, the carrier indication may be included in the RUM.

A carrier indication may take various forms. For example, in some cases the carrier indication may take the form of a set of bits where each bit corresponds to a branch of a tree, and where each branch corresponds, in turn, to a carrier. For example, one bit may correspond to a first carrier, another bit may correspond to a set of carriers (e.g., which may include one or more carriers or sets of carriers). In other cases, the carrier indication may take the form of a bit mask. For example, each bit of the mask may correspond to a unique one of the carriers.

A RUM may take various forms. For example, in some cases a RUM may consist of a series of tones. In some cases different tones may cover different frequency bands. In some cases the RUMs from different nodes may be ordered in some manner (e.g., in time and/or frequency).

A RUM may be transmitted in various ways. In some cases a RUM may be broadcast. In some cases a RUM may be transmitted at a known (e.g., constant) power level (e.g., power spectral density). In some cases a RUM may be sent over one or more frequency division multiplexed channels (e.g., frequency multiplexed with respect to one or more data channels). In some cases a RUM may be sent over one or more time division multiplexed channels (e.g., time multiplexed with respect to one or more data channels).

Figure 5:
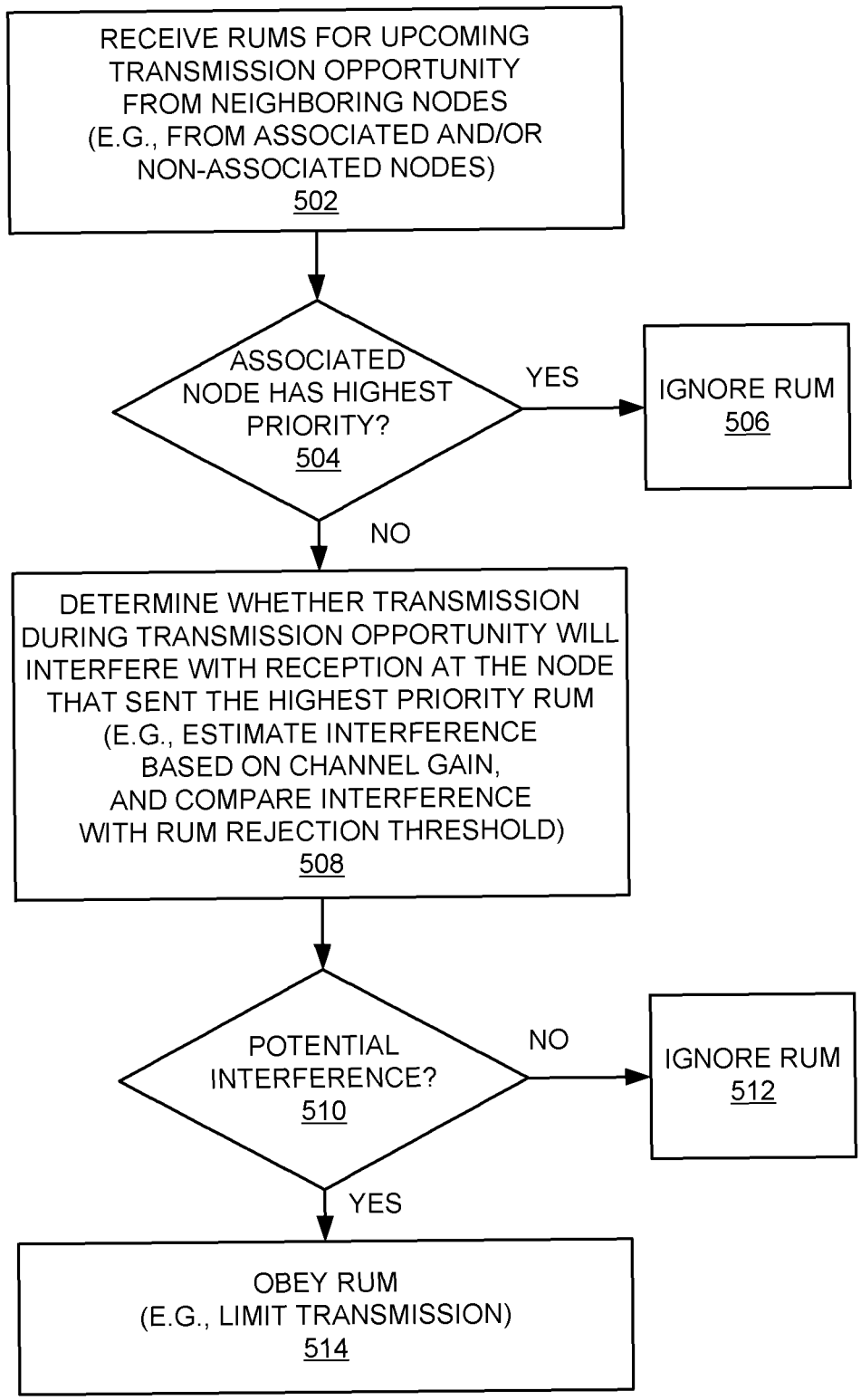
FIG. 5 is a flowchart of several sample aspects of operations that may be performed to determine whether to react to a received RUM.
Figure 6:
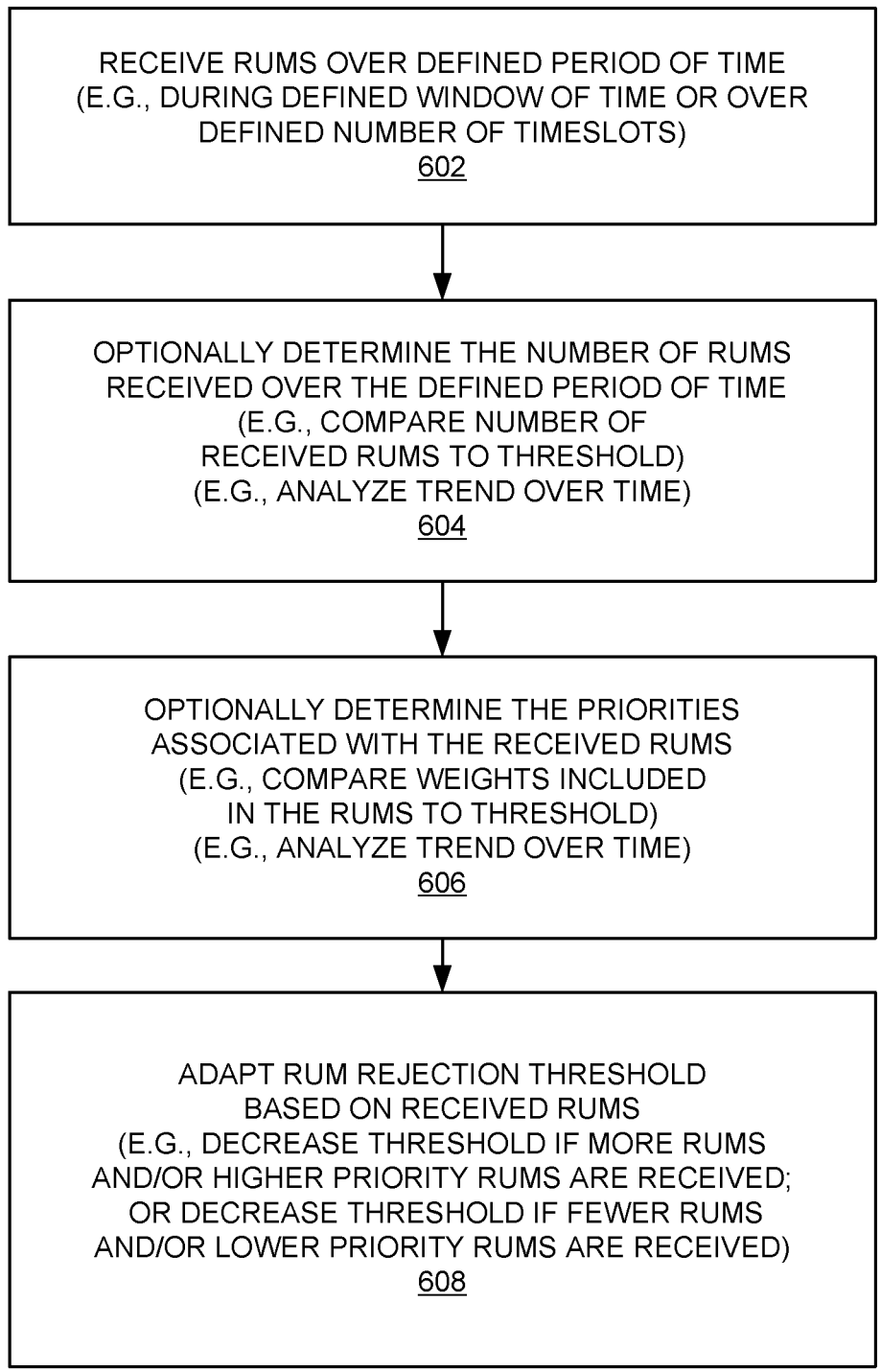
FIG. 6 is a flowchart of several sample aspects of operations that may be performed to adapt a RUM rejection threshold.

FIGS. 5 and 6 describe sample operations that the transmitting node 304 (e.g., an access point or access terminal) may perform in conjunction with using an adaptable RUM rejection threshold to determine whether to react to a received RUM. FIG. 5 describes how the node 304 may use a RUM rejection threshold. FIG. 6 describes how the node 304 may adapt the RUM rejection threshold. Here, it should be appreciated that the term RUM rejection threshold is used for convenience and that a threshold designated in this manner may inherently be used as a RUM acceptance (or obey) threshold (e.g., by accepting that which would not be rejected).

As represented by block 502, at various points in time the node 304 (e.g., node 102D of FIG. 1) will receive RUMs from one or more neighboring nodes. For example, the node 304 may receive RUMs from one or more associated receiving nodes (e.g., node 104C) or from one or more non-associated receiving nodes (e.g., node 104B).

As represented by block 504, the node 304 may resolve any contention between the received RUMs for a resource (e.g., use of a carrier during a given timeslot or interlace) based on the priorities associated with the RUMs. For example, if several nodes send RUMs for the same resource, the node that sent the RUM associated with the highest priority may be given priority to use the resource.

As represented by block 506, if a node that wishes to receive from the node 304 (i.e., node 304's associated receiving node) has the highest priority, the node 304 may simply ignore the RUM. In this case, the neighboring interfering nodes may limit their transmissions since their associated receiving nodes did not win the contention for the resource. Since these interfering nodes will be cleared off the resource, the node 304 will be free transmit to its receiving node using the resource once it is scheduled to do so (e.g., by an access point).

In contrast, if a receiving node associated with the node 304 did not transmit a RUM or did not transmit a RUM having the highest priority, the node 304 may perform operations as in block 508 to determine whether to obey the highest weight RUM. Here, the node 304 may determine whether its transmission (e.g., during a designated transmission opportunity) will interfere with reception at the RUM-sending node that sent the highest weight RUM.

In some aspects, this determination may involve comparing a RUM rejection threshold with a value associated with (e.g., derived from) the received RUM. In other words, the node 304 may elect to obey or ignore the RUM depending on whether this value is less than, great than, or equal to the threshold. For example, the RUM rejection threshold may be defined as a value that represents the maximum allowable level of interference at the RUM-sending node. In this case, the node 304 may estimate the amount of interference its transmission would cause at the RUM-sending node. The node 304 (e.g., a received RUM analyzer 334) may thus compare this interference estimate value with the RUM rejection threshold at block 510. If the value is less than (or less than or equal to) the threshold—thereby indicating that the interference will fall below a specified level—the node 304 may elect to ignore the RUM (block 512). Otherwise, the node 304 may elect to obey the RUM (block 514).

The interference estimate may be generated in various ways. For example, as mentioned above, a RUM may be transmitted at a known power level. Moreover, the RUM may be transmitted over a control channel that has a relatively low reuse factor (e.g., 1/10 or less) so that a RUM transmission tends to experience a noise-limited channel as opposed to an interference-limited channel. As a result, the received signal strength of the RUM may be proportional to the signal-to-noise ratio, and thereby serve as a surrogate measure for detectability of the RUM. A channel analyzer 336 of the node 304 (e.g., in cooperation with the transceiver 308) may thus determine the path loss to the RUM-sending node by, for example, measuring the power of the received RUM. Based on this path loss information and the known transmitting power of the transmitter 312, the node 304 may estimate the level of interference its transmission will cause at the RUM-sending node.

Referring now to FIG. 6, as mentioned above, a RUM rejection threshold may be adapted based on one or more received RUMs. Accordingly, as represented by block 602, the node 304 may acquire a set of one or more RUMs over a defined period of time (e.g., defined as one or more timeslots, one or more interlaces, etc.). In some cases, the set of RUMs may consist of or include the latest received RUM (e.g., the RUM that the node 304 is currently determining whether to obey).

As represented by block 604, the node 304 (e.g., the received RUM analyzer 334) may optionally determine whether there has been a large number or small number (or an increase or a decrease in the number) of RUMs received over the defined period of time. The node 304 may determine the number of received RUMs in various ways. For example, the node 304 may employ a sliding window (of a duration equal to the defined period of time) and maintain a count 338 of the number of RUMs received during each instance of the window in a data memory 340.

As represented by block 606, the node 304 (e.g., the received RUM analyzer 334) may optionally determine whether there have been higher or lower (or an increase or a decrease in) priorities associated with the RUMs received over the defined period of time. The node 304 may determine the priorities associated with the received RUMs in various ways. For example, the node 304 may employ a sliding window (of a duration equal to the defined period of time) and maintain a list 342 of the priorities associated with the RUMs received during each instance of the window.

In some aspects, the node 304 may track RUMs from a specified subset of nodes or may track RUMs having a particular characteristic. For example, in some cases the node 304 may track the RUMs from a node that has (e.g., on average) the highest priority RUMs (e.g., to monitor any trends in the weights from that node). In addition, in some cases the node 304 may track the highest weight RUMs (e.g., to monitor any trends in the highest received weights).

As represented by block 608, the node 304 may adapt a RUM rejection threshold based on the received RUMs. For example, a RUM rejection threshold ("RRT") definer 344 of a decision parameter adapter 346 may adjust the RUM rejection threshold based on the RUM quantity or priority information obtained at blocks 604 and 606.

As a more specific example, if there has been a large number (or an increase in the number) of received RUMs, the RUM rejection threshold may be adapted (e.g., decreased) so that the node 304 is more likely to obey a received RUM. Conversely, if there has been a small number (or a decrease in the number) of received RUMs, the RUM rejection threshold may be adapted (e.g., increased) so that the node 304 is less likely to obey a received RUM.

Similarly, if the node 304 has received relatively high (or seen an increase in) priority values, the RUM rejection threshold may be adapted (e.g., decreased) so that the node 304 is more likely to obey a received RUM. Conversely, if the node 304 has received low (or seen a decrease in) priority values, the RUM rejection threshold may be adapted (e.g., increased) so that the node 304 is less likely to obey a received RUM.

The node 304 may employ various techniques to characterize the number (or a change in the number) of received RUMs. For example, in some cases the node 304 may compare the number of received RUMs with a threshold number of RUMs. In addition, in some cases the node 304 may determine whether there is some sort of trend (e.g., an increase or decrease) in the number of received RUMs over a period of time. In other words, the node 304 may track the evolution of the number of RUMs received so that the adaptation of the RUM rejection threshold is done on a slower time scale (e.g., not based on every RUM received or the absence of RUMs over a very short time period).

The node 304 also may employ various techniques to characterize the values (or a change in the values) of the RUM priorities. For example, in some cases the node 304 may compare the priorities with a threshold priority level. In addition, in some cases the node 304 may determine whether there is some sort of trend (e.g., an increase or decrease) in the priority values over a period of time. Thus, the node 304 also may track the evolution of the priorities so that the adaptation of the RUM rejection threshold is done on a slower time scale.

Equation 1 illustrates an example of how a RUM rejection threshold may be adapted based on the number of received RUMS. In Equation 1, RRT is decremented by a value $\Delta T$ (down to a minimum defined RRT value) if two or more RUMs are received. Conversely, RRT is incremented by the value $\Delta T$ (up to a maximum defined RRT value) if less than two RUMs are received. It should be appreciated that similar techniques may be employed for RUM priorities. In addition, it should be appreciated that different algorithms may be used to adapt a RUM rejection threshold.

$$RRT(n+1) = \begin{cases} \max(RRT(n) - \Delta T, RRT_{min}), & \text{if} \geq 2 \text{ recieved } RUMs \\ \min(RRT(n) + \Delta T, RRT_{max}), & \text{otherwise} \end{cases} \quad (1)$$

The adaptation of the RUM rejection threshold may be based on specified RUMs (e.g., a subset of the received RUMs). For example, in some cases the node 304 may adapt the threshold based only on the RUMs having the highest priorities. In some cases the node 304 may adapt the threshold based only on the RUMs received from a specified node (e.g., the node having the highest priority RUMs). For example, the node 304 may adapt the threshold based on an increase or decrease in the weights from a subset of the nodes (e.g., the specified node) rather than adapting the threshold based on, for example, an increase or decrease in the average weight of the RUMs received from all nodes.

Figure 7A:
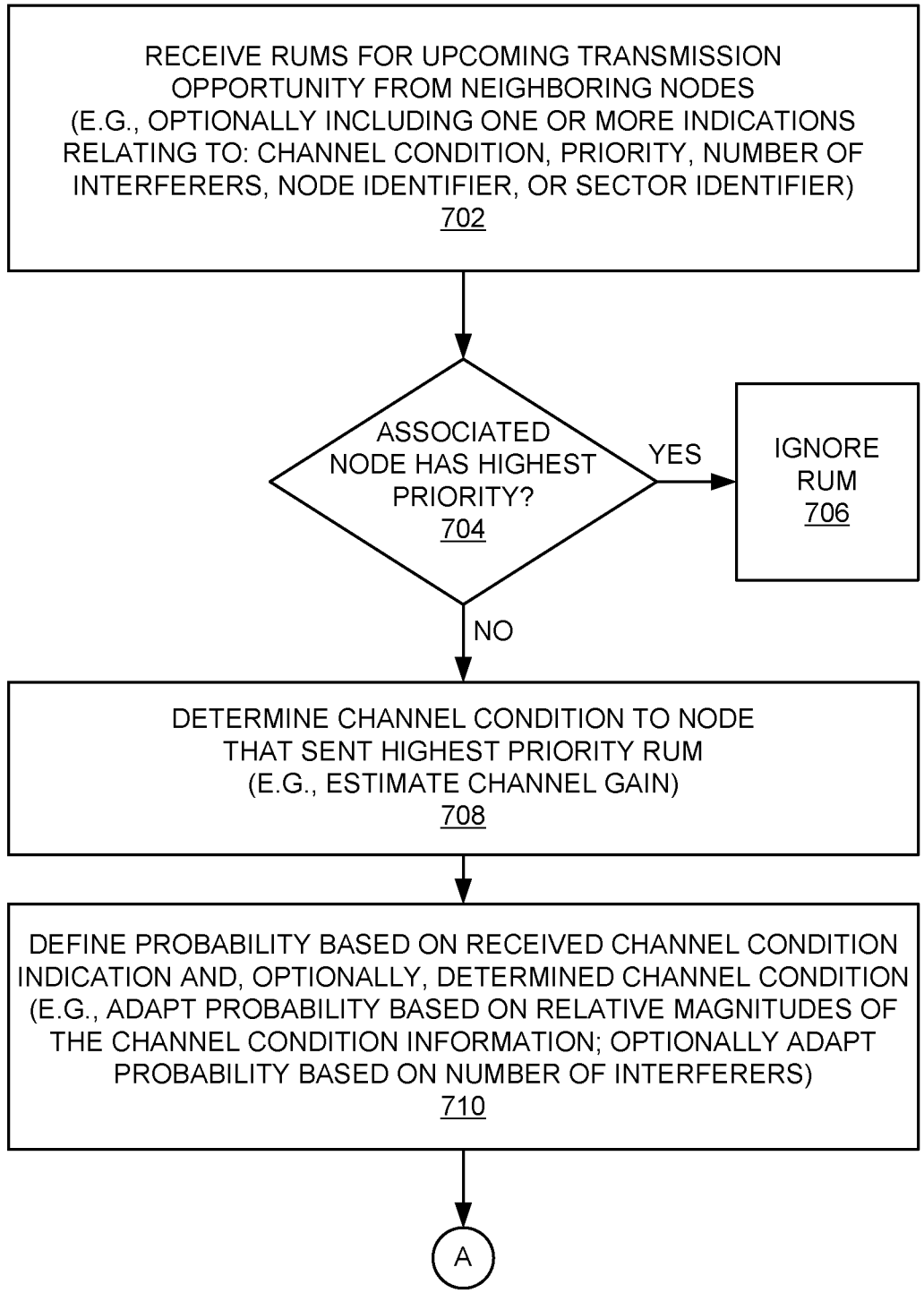
FIGS. 7A and 7B comprise a flowchart of several sample aspects of operations that may be performed to determine whether to obey a received RUM based on a probability.
Figure 7B:
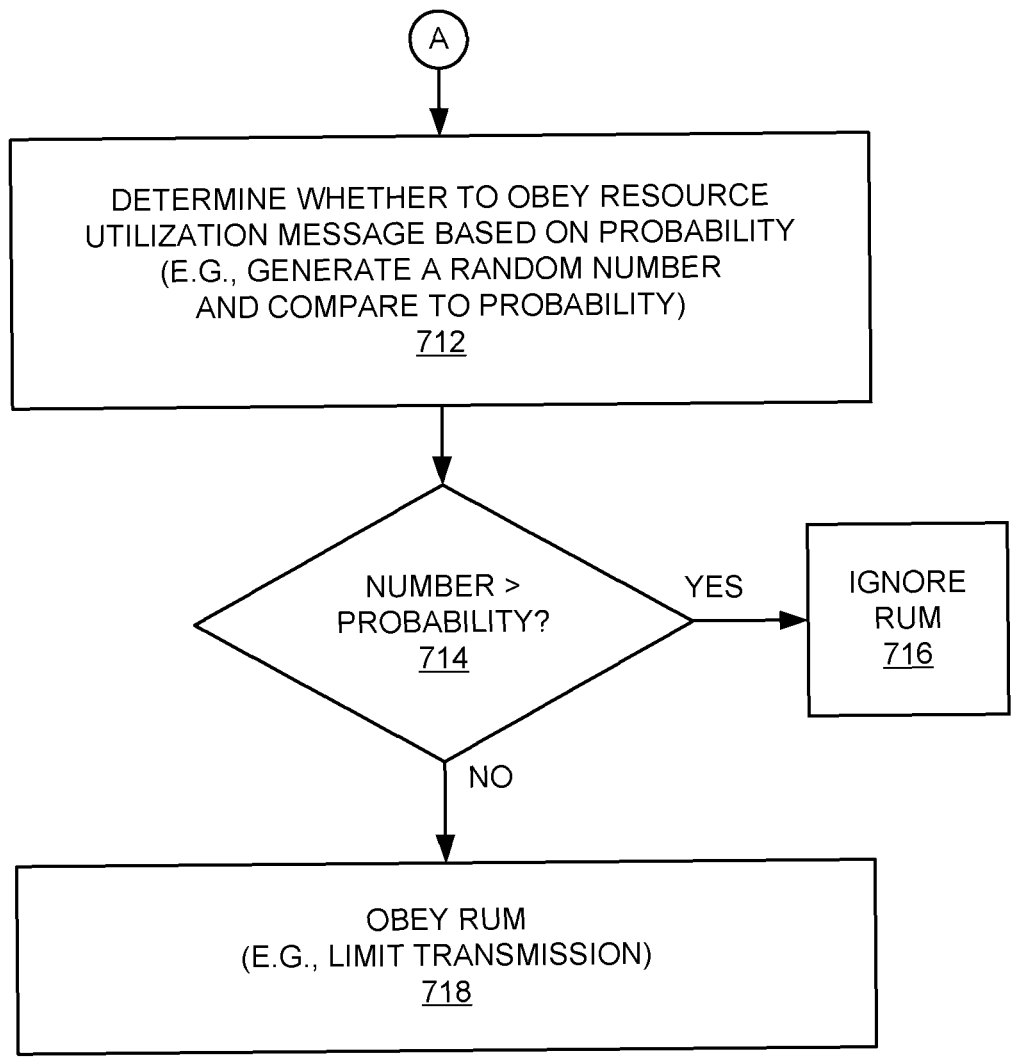
Figure 8:
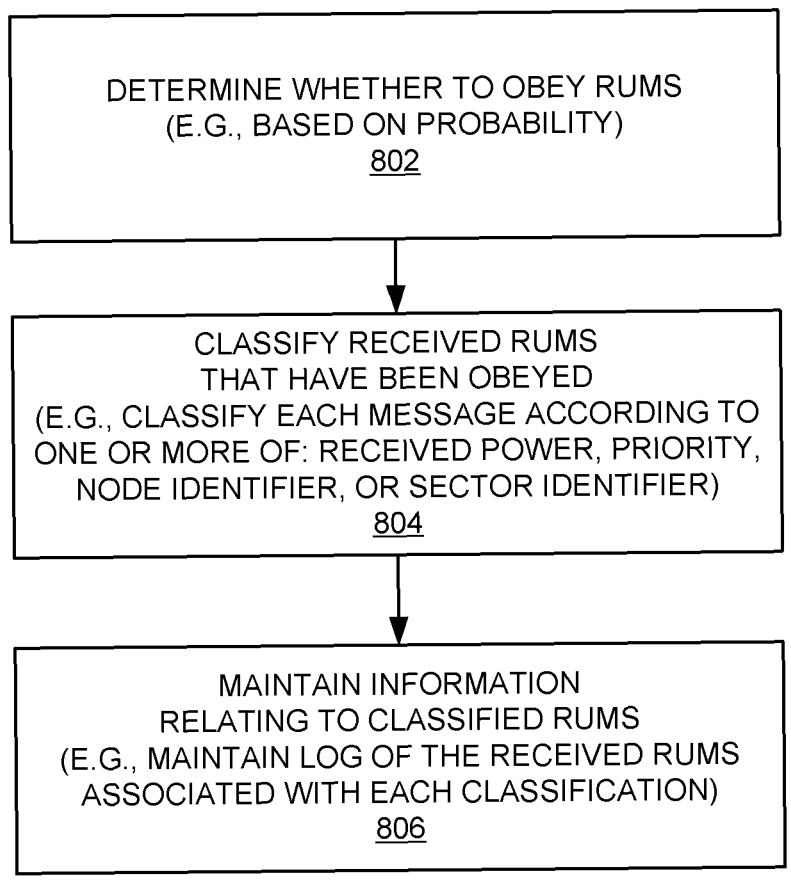
FIG. 8 is a flowchart of several sample aspects of operations that may be performed to classify received RUMs.
Figure 9A:
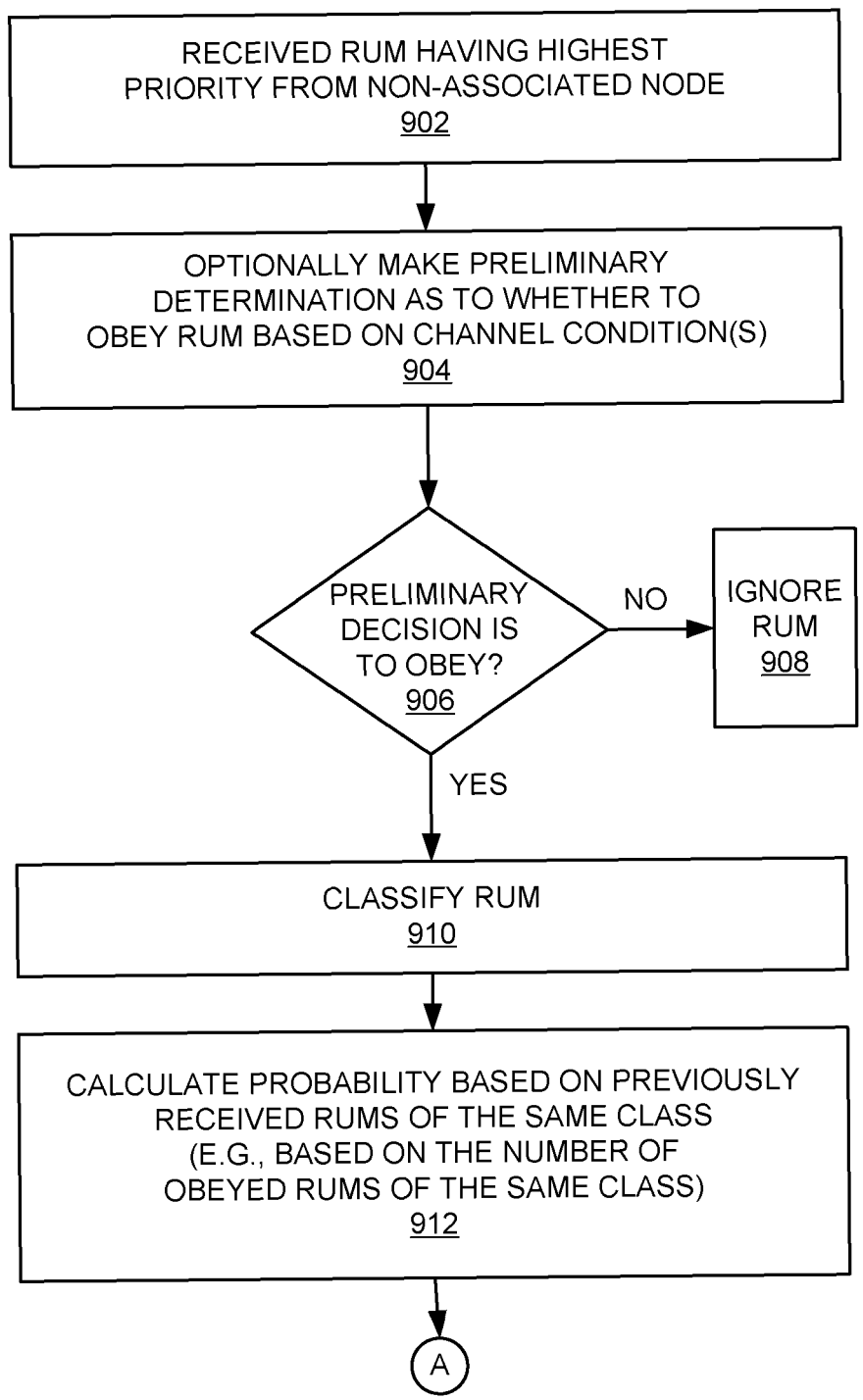
FIGS. 9A and 9B comprise a flowchart of several sample aspects of operations that may be performed to determine whether to obey a received RUM based on previously received RUMs.
Figure 9B:
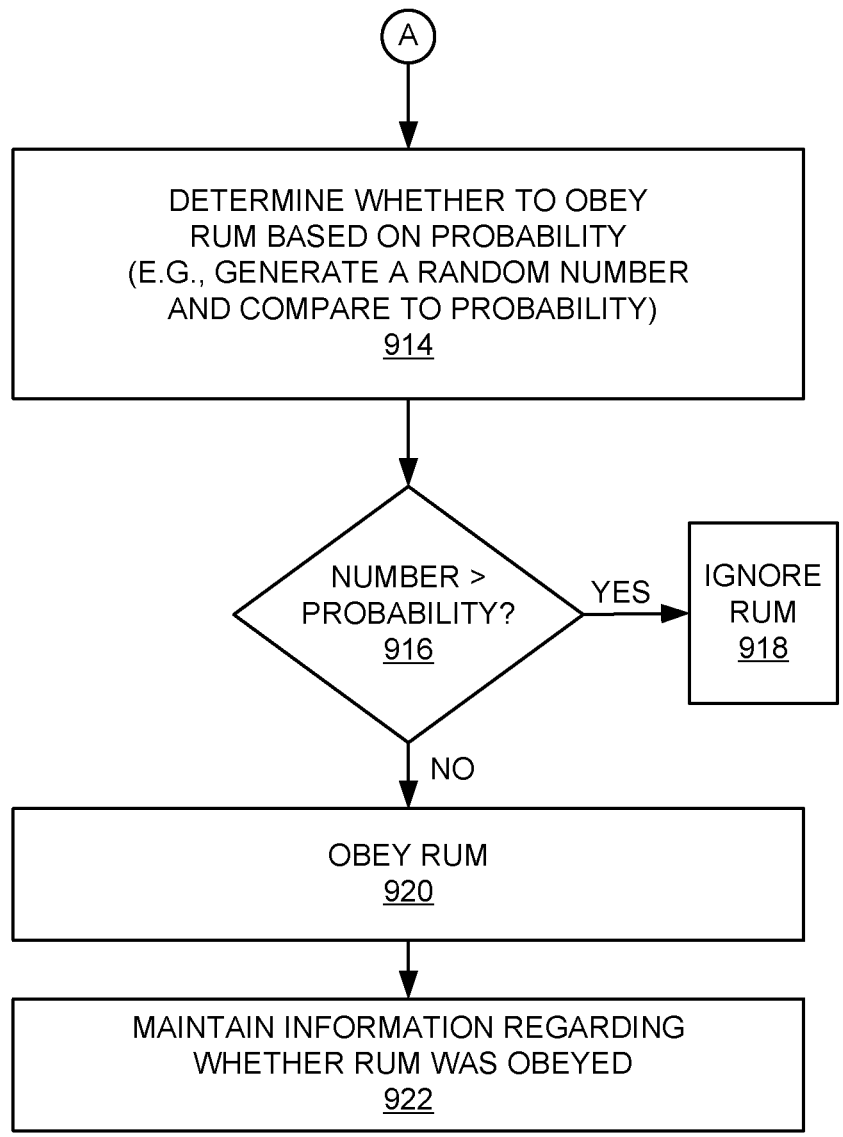

Referring now to FIGS. 7A-9B, sample operations that the transmitting node 304 may perform in conjunction with using a probability decision parameter to determine whether to react to a received RUM will now be treated. FIGS. 7A and 7B describe an example of how the node 304 may define (e.g., adapt) and use a probability parameter based on one or more channel conditions. FIG. 8 describes an example of how the node 304 may classify and maintain received RUM information. FIGS. 9A and 9B describe an example of how the node 304 may define (e.g., adapt) and use a probability parameter based on received RUM information.

As represented by block 702 of FIG. 7A, the node 304 receives RUMs from one or more neighboring nodes. As mentioned above, a given RUM may attempt to reserve resources for one or more upcoming transmission opportunities (e.g., timeslots). In addition, as discussed above in conjunction with block 412, a RUM may include one or more indications relating to a condition of a channel, priority, a number of interferers, a node identifier, or a sector identifier.

As represented by blocks 704 and 706, the node 304 may resolve any contention between the received RUMs for a resource based on the priorities associated with the RUMs. Again, if the RUM from a receiving node for the node 304 has the highest priority, the node 304 may simply ignore the RUM. Otherwise, the operational flow proceeds to blocks 708-718 where the node 304 determines whether to obey the highest priority RUM from some other receiving node.

As represented by block 708, the node 304 (e.g., the channel analyzer 336) may determine the condition of the channel between the node 304 and the RUM-sending node associated with the highest priority. Here, a channel condition may relate to channel gain or some other parameter. For example, as mentioned above, a RUM may be transmitted at a known power level over a relatively noise-limited channel. The channel analyzer 336 (e.g., in cooperation with the transceiver 308) may thus determine the path loss over the channel to the RUM-sending node by, for example, measuring the power of the received RUM. Based on this path loss information, the node 304 may estimate the channel gain of the channel between the node 304 and the RUM-sending node.

As represented by block 710, the node 304 may define (e.g., adapt) a probability parameter based on one or more channel conditions associated with the RUM-sending node. In the example of FIG. 3, the probability may be defined by a probability definer 348 of the decision parameter adapter 346.

As discussed above in conjunction with block 408, one form of channel condition may relate to a channel over which a transmitting node sends data to an associated receiving node (e.g., a RUM-sending node). For example, if a RUM-sending node has a good channel to its associated transmitting node, transmissions by a non-associated transmitting node that is relatively far (e.g., taking its transmit power into account) from the RUM-sending node will probably not cause significant interference at the RUM-sending node. Consequently, the non-associated transmitting node may be allowed to ignore the RUMs from the RUM-sending node in this case.

Conversely, if a RUM-sending node has a poor channel to its associated transmitting node, it is more likely that transmissions of a non-associated transmitting node will cause interference at the RUM-sending node. Thus, in this case, it may be desirable for the non-associated transmitting node to obey the RUMs from the RUM-sending node even if the non-associated transmitting node is not relatively close (e.g., taking its transmit power into account) to the RUM-sending node.

In some aspects, a channel condition (e.g., a good channel or a poor channel) may be characterized by a channel gain of the channel. Thus, as described above in conjunction with FIG. 4, a probability may be based on a channel condition indication included in the RUM. For example, the probability of obeying a RUM may change in an indirect manner in response to any changes in the channel gain of a channel between the RUM-sending node and its transmitting node. For example, an increase in this channel gain may lead to an decrease in the probability.

In some aspects, a probability also may be based on the condition (e.g., channel gain) of a channel between the RUM-sending node and an interfering node (e.g., a non-associated transmitting node) that received a RUM from the RUM-sending node. Here, the probability of obeying a RUM may change in a direct manner in response to any changes in the channel gain of a channel between the RUM-sending node and an interfering node. For example, an increase in this channel gain may lead to an increase in the probability.

In some aspects, a probability may be based on the relative channel conditions (e.g., channel gains) of the two channels described above. For example, a decision to obey a RUM may be based on how good of a channel a RUM-sending node has to its associated transmitting node as compared to how much interference the RUM-sending node may see on a channel from a non-associated interfering node. An example of an algorithm that may be used to define such a probability is set forth in Equation 2.

$$P_{kj} = 1 - \min(1, \max(0, \log_{10}(h_{jj}/h_{kj}))) \qquad (2)$$

Here, $P_{kj}$ is the probability of a node k obeying a RUM from a node j, $h_{jj}$ is the channel gain from node j to its transmitting node, and $h_{kj}$ is the channel gain from node k to node j. The parameter $h_{jj}$ may be included in the RUM sent by node j. From Equation 2 it may be seen that $P_{kj}$ is close to zero if the relative magnitude of $h_{jj}$ is large with respect to the magnitude of $h_{kj}$. Thus, node k will be less likely to obey a RUM as the channel condition $h_{jj}$ improves relative to the channel condition $h_{kj}$. Conversely, the probability $P_{kj}$ is close to one if the relative magnitude of $h_{jj}$ is small with respect to the magnitude of $h_{kj}$. Thus, in this case, node k will be more likely to obey a RUM as the channel condition $h_{jj}$ deteriorates relative to the channel condition $h_{kj}$.

In some cases (e.g., on a reverse link from an access terminal to an access point) reception at a receiving node may be adversely affected by transmissions from a relatively large number of interfering nodes that collectively cause a low signal-to-noise ratio for received data at the receiving node. Here, the use of a probability-based RUM obey scheme will generally result in a subset of the nodes that receive a RUM from the receiving node obeying the RUM (e.g., as a result of the unique probability-based decisions made by each node). Consequently, where there are a large number of interferers, the transmissions by the interfering nodes that did not obey the RUM may still collectively cause an undesirable level of interference at the receiving node.

Accordingly, in some cases a decision to react to a RUM may be based on the number of interferers seen by a receiving node (i.e., the RUM-sending node). For example, an interfering node may employ a higher probability for obeying a RUM if the RUM-sending node sees a large number of interferers and may employ a lower probability for obeying a RUM if the RUM-sending node sees a small number of interferers.

In some cases, a RUM-sending node may include information in a RUM indicative of the number (e.g., the fraction) of interfering nodes that should obey the RUM. For example, the RUM may include an index into a look-up table of functions. Any nodes that receive the RUM may then use this index indication to determine the function to be used to determine whether to obey the RUM (e.g., to determine a probability of obeying the RUM).

An example of an algorithm that may be used to define a probability based on such an indication provided by a RUM is set forth in Equation 3. Such an algorithm may be used instead of the algorithm of Equation 2.

$$P_{kj} = \exp(n^*(a-1)) \qquad (3)$$

where $a = \min(1, h_{kj}/h_{jj})$

Here, the parameter n may be used to control the number of transmitting nodes that obey a RUM. For example, higher values of n result in a lower probability $P_{kj}$ of obeying a RUM (i.e., $P_{kj}$ is closer to zero), and vice versa. In some cases, the value for n in Equation 3 may be based on (e.g., comprise the inverse of) the number of interferers seen by node j. Thus, if there are more interferers (resulting in a lower value for n), a node that receives a RUM including the indication n will be more likely to obey the RUM.

In some cases, such an indication may comprise one of a set of defined numbers. For example, RUMs that attempt to clear a forward link may use one value (e.g., 3) for the indication while RUMs that attempt to clear a reverse link may use a different value (e.g., 0.1) for the indication. Such a scheme may be used, for example, in cases where it is known or expected that different links will typically have different numbers of potential interferers.

Referring now to FIG. 7B, as represented by block 712, the node 304 may determine whether to react to the received RUM based on the probability. For example, a transmission controller 350 may generate a random number (e.g., from zero to one) and compare the number to the probability defined at block 710. If the random number is greater than the probability at block 714, the node 304 may ignore the RUM (block 716). Otherwise, the node 304 may obey the RUM (block 718).

In some aspects, a probability of reacting to a RUM may be based on previously received RUMs. For example, a RUM-sending node may employ a criteria for sending RUMs that results in the transmission of more RUMs than is warranted under the circumstances (e.g., from a system performance perspective). As a result, a transmitting node may receive a large number of RUMs from that RUM-sending node. To avoid giving too much priority to the RUMs from the RUM-sending node, the transmitting node may reduce the probability with which it obeys RUMs from any RUM-sending node that sends a large number of RUMs.

In some aspects a probability of reacting to a RUM may be based on the number of RUMs received from a specified class of RUM-sending nodes. For example, in some cases a transmitting node may classify RUMs it receives based on the identity of each node that sent a RUM. As discussed above, this information may be indicated by a node identifier included in the RUM. Through the use of this information, a transmitting node may readily identify RUMs from a particular node to determine, for example, whether that nodes is sending too many RUMs.

In some cases a transmitting node may classify RUMs it receives based on the sector of each node that sent a RUM. This information may be indicated by a sector identifier included in the RUM or in some other manner (e.g., based on the location of the node and signaling associated with the RUM). In these cases, a transmitting node may readily identify RUMs from a particular sector to determine, for example, whether the nodes in that sector are sending too many RUMs.

In some cases, however, a RUM may not include an identifier. For example, it may be desirable to keep the number of bits in the RUM to a minimum to reduce the overhead (e.g., power and bandwidth) associated with transmission of RUMs. In such a case, RUMs may be classified based on the power level of each received RUM, the priority associated with each received RUM, or some other characteristic associated with a RUM or node. For example, it may be assumed that any received RUMs that have a received power level that falls within a certain range may have originated from the same node (or a relatively small subset of nodes). Consequently, this classification scheme may be used to determine, for example, whether the node or nodes in this group are sending too many RUMs.

FIG. 8 illustrates sample operations that may be performed to classify received RUMs. In this example, the node 304 classifies the RUMs that have been obeyed.

As represented by block 802, upon receipt of each RUM, the node 304 determines whether to obey the RUM. Thus, the operation of block 802 may correspond to the operations described above in conjunction with FIG. 7.

As represented by block 804, for each RUM that has been obeyed, the node 304 (e.g., a classifier 352) classifies the RUM based on one or more classification factors. For example, as discussed above, the classifier 352 may classify each RUM based on the identity of the node that sent the RUM, an associated sector, a received power level, or an associated priority.

As represented by block 806, the node 304 may maintain information relating to the classified RUMs in a data memory 354. For example, the node 304 may maintain an indication of whether the last received RUM for each classification (e.g., bin) was obeyed or may maintain counts of the number of obeyed RUMs for each classification. For example, a set of node identifier classes 356 may include one entry for one node, another entry for another node, and so on. In a similar manner, a set of sector identifier classes 358 may include multiple entries for different sectors. A set of power classes 360 may include multiple entries for different power ranges. For example, a first classification may correspond to a power level in a range of 0-0.9, a second classification may correspond to power level in a range of 1.0-1.9, and so on. A set of priority classes 362 may include multiple entries for different priorities (e.g., a weight of 1, a weight of 2, and so on).

Such information may be maintained in various ways. For example, in some cases each entry in a bin may expire (e.g., be removed from the bin) after a certain period of time. Also, in some cases a bin that maintains a count may have a fixed size.

FIGS. 9A and 9B illustrate sample operations that may be performed to determine whether to react to a RUM based on previously received RUMs. This example illustrates a two-step process where the node 304 makes a preliminary determination at blocks 904-908 regarding whether the received RUM should be obeyed (e.g., based on the techniques described in FIG. 7) and then makes a final determination at blocks 910-920 as to whether the received RUM should be obeyed based on the number of RUMs (e.g., of the same class as the received RUM) that have been obeyed. It should be appreciated, however, that a determination of whether to react to a RUM based on previously received RUMs need not employ this preliminary determination.

As represented by block 902, the operations of FIGS. 9A and 9B may involve operating on a RUM that has the highest priority and that is not from the node 304's associated receiving node. Thus, the operations of block 902 may be similar to the operations of blocks 702-706 discussed above.

As represented by the optional blocks 904-908, the node 304 performs operations such as those described at blocks 708-716 to make a preliminary determination as to whether to obey the received RUM based on one or more channel conditions, the number of interferes, or some other criteria. If a decision is made to not obey the RUM at block 906, the node 304 may not make any further determination based on previously received RUMs. Conversely, if a preliminary decision to obey the RUM is made at block 906, the operational flow may proceed to block 910.

As represented by block 910, the node 304 (e.g., the classifier 352) classifies the received RUM. For example, as discussed above the RUM may be classified based on an associated node identity, sector identity, power level, priority, and so on.

As represented by block 912, the node 304 (e.g., the probability definer 348) determines a probability of reacting to the received RUM based on the number of RUMS of the same class as the received RUM that nave been obeyed (e.g., over a defined period of time). Equation 4 illustrates an example of an algorithm that may be employed to define such a probability.

$$P^j(n)=1-R^j(n) \qquad (4)$$

where $R^j(n+1)=a*R^j(n)+(1-a)*I\{\text{obey a } RUM \text{ of same class}\}$

Here, $P^j(n)$ is the probability of obeying a RUM associated with a class j (e.g., a bin j). For example, as discussed above, a probability $P^j(n)$ may be defined to determine whether to react to RUMs from a node j, from a sector j, from a power level class j (e.g., a corresponding range), from a priority class j (e.g., a corresponding range), and so on. In this example, $P^j(n)$ is adapted by calculating a new value for $R^j(n+1)$ (e.g., upon receipt of each RUM for class j).

The parameter a (e.g., a number between 0 and 1) affects how quickly $R^j(n+1)$ changes. Thus, this parameter may affect the number of RUMs of a given class that are obeyed (or ignored) in succession.

The indicator function I{ } is used to indicate whether a prior RUM has been obeyed. For example, in some cases I{ } is equal to 1 if a RUM associated with bin j was obeyed and is equal to 0 otherwise. Here, the particular RUM operated on by the indicator function I{ } may be the last RUM for which a decision to obey or ignore was made. Alternatively, the indicator function I{ } may generate a result based on some other RUM or a plurality of RUMs (e.g., a set of RUMs received over a period of time).

From Equation 4 it may be observed that the value of $R^j(n)$ is based on the number of RUMs of a particular class (e.g., from a specific node) that have been received. Moreover, in this particular example, $R^j(n)$ is based on the number of obeyed RUMs for class j. In some respects, $R^j(n)$ relates to a running average of the received RUMs for node j that are obeyed (e.g., a percentage of obeyed RUMs over a period of time). It should be appreciated based on the teachings herein that such a parameter may be based on some other criterion or criteria and may calculated in various ways (e.g., based on some other algorithm).

In some aspects, the parameters of Equation 4 are interrelated. For example, $R^j(n+1)$ may increase if a previous RUM was obeyed. Consequently, $P^j(n)$ may decrease in this case. Thus, the probability of a transmitting node obeying a RUM will decrease if a previous RUM was obeyed. However, as $P^j(n)$ approaches zero, fewer RUMs will be obeyed. This, in turn may cause $R^j(n+1)$ to decrease.

In some cases, Equation 4 may be modified to change the steady state probability of obeying a RUM. That is, the normal steady state probability of obeying a RUM from a node that continually sends RUMs may be 0.5. If desired, however, this steady state probability may be modified to cause the algorithm to obey more RUMs or fewer RUMs, on average. Equation 5 illustrates an example of how $P^j(n)$ may be modified in this regard.

$$P^j(n) = q*(1-R^j(n)) \quad (5)$$

In this example, the steady state probability of obeying a RUM for class j may be $p^j=1/(1+q)$. Thus, a node may be configured to obey more RUMs by making q smaller.

Referring now to FIG. 9B, as represented by block 914, the node 304 determines whether to react to the received RUM based on the above probability. For example, the transmission controller 350 may generate a random number (e.g., from zero to one) and compare that number to the probability defined at block 912. If the random number is greater than the probability at block 916, the node 304 may ignore the RUM (block 918). Otherwise, the node 304 may obey the RUM (block 920).

As represented by block 922, the node 304 may then update the classification information to indicate whether the RUM was obeyed. Thus, this operation may involve operations that are similar to those described above for block 806.

From the above, it may be seen that a probability may be defined (e.g., adapted) based on one or more values associated with (e.g., derived from) a received RUM itself and/or information included in a RUM. For example, the probability may be defined based on the channel condition included in the received RUM. In addition, the probability may be defined based on a channel condition derived from the received power of the RUM. Also, the probability may be defined based on an indication included in the RUM relating to a number of interferers. Moreover, the probability may be defined based on the number of received RUMs. It should be appreciated based on the teachings herein that a probability relating to whether to react to a RUM or some other similar message or condition may be based on another factor or factors. In addition, such a probability may be based on a combination of one or more factors.

A probability-based decision to obey or ignore RUMs may be implemented in various ways when multiple RUMs are received. For example, in some aspects a random probability (e.g., a coin toss) may be made for each received RUM independently. In some aspects, one of the probabilities calculated for the received RUMs may be selected. The selected probability may then be used to determine whether to obey or ignore each of the received RUMs. For example, in some cases the maximum obey probability of the various obey probabilities determined for each of the received RUMs may be selected. In some cases, the probability associated with a received RUM having a certain characteristic (e.g., a RUM characteristic as described herein such as the highest priority, the highest weight, and so on) may be selected.

In some aspects, a decision to obey or ignore a RUM may be based on a combination of any of the factors described herein. For example, a decision hierarchy may be employed where a decision is made at each level of the hierarchy. A RUM may then be obeyed if each of these decisions is satisfied. A non-limiting example follows. As a first step, an estimated interference value based on the received power of a RUM may be compared with a RUM rejection threshold (e.g., as described at FIG. 5). If the first step provides a preliminary indication to obey the RUM (e.g., the estimated interference exceeds the RUM rejection threshold), a second step is performed. Otherwise, the RUM may be ignored. At the second step, a probability based on a channel gain indication received via the RUM may be employed to determine whether to obey the RUM (e.g., as described at FIGS. 7A and 7B). If the second step provides a preliminary indication to obey the RUM (e.g., the random number is less than the channel gain-based probability), a third step is performed. Otherwise, the RUM may be ignored. In the third step, a probability based on tracked messages (e.g., the number of received RUMS) may be employed to determine whether to obey the RUM (e.g., as described at FIGS. 9A and 9B). If the third step also indicates that the RUM should be obeyed (e.g., the random number is less than the classification-based probability), the RUM is obeyed. Otherwise, the RUM may be ignored.

Figure 10:
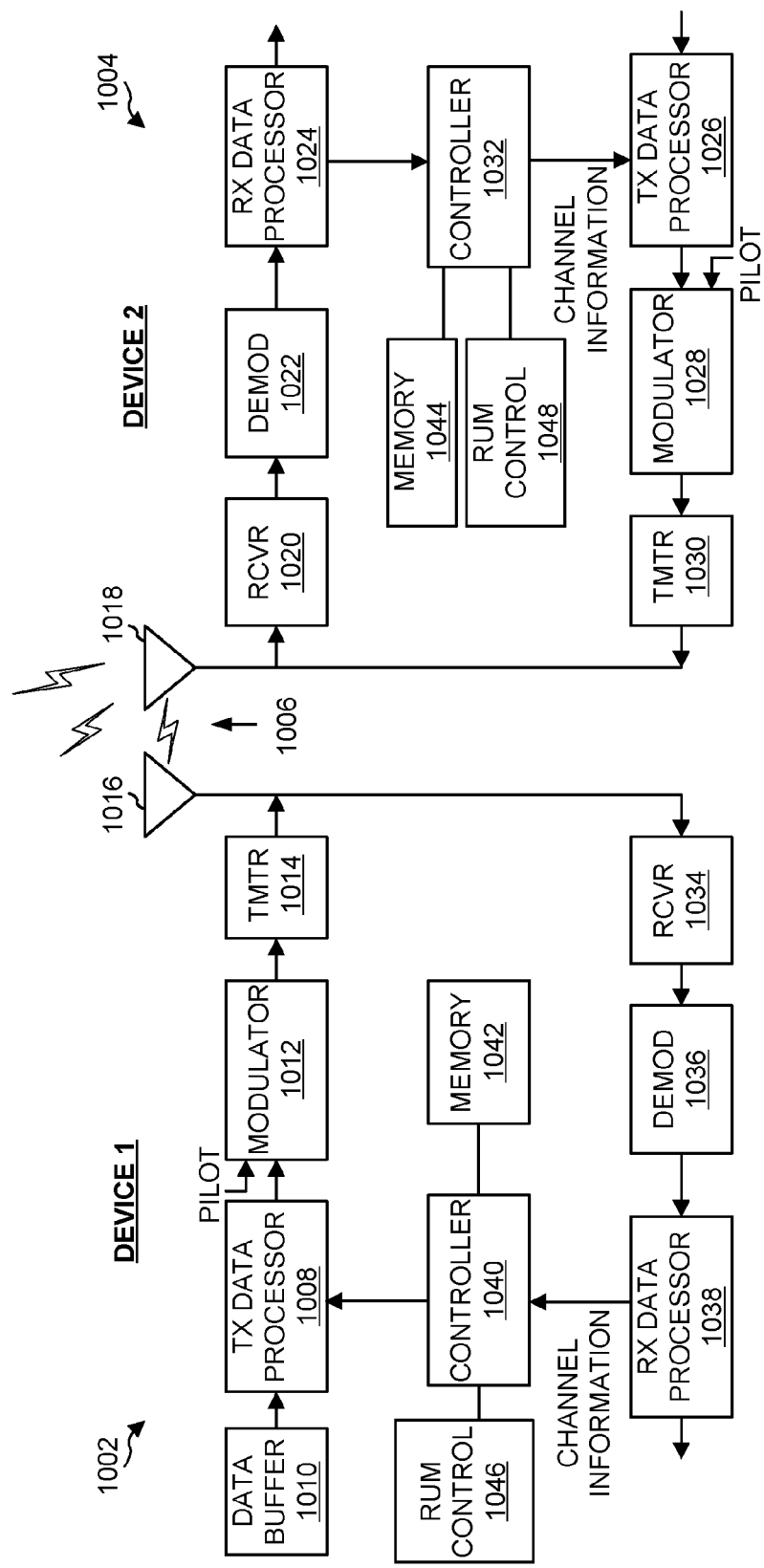
FIG. 10 is a simplified block diagram of several sample aspects of communication components.

The teachings herein may be incorporated into a device employing various components for communicating with at least one other wireless device. FIG. 10 depicts several sample components that may be employed to facilitate communication between devices. Here, a first device 1002 (e.g., an access terminal) and a second device 1004 (e.g., an access point) are adapted to communicate via a wireless communication link 1006 over a suitable medium.

Initially, components involved in sending information from the device 1002 to the device 1004 (e.g., a reverse link) will be treated. A transmit ("TX") data processor 1008 receives traffic data (e.g., data packets) from a data buffer 1010 or some other suitable component. The transmit data processor 1008 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1012 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1014 processes (e.g., converts to analog, filters, amplifies, and frequency upconverts) the output chip stream and generates a modulated signal, which is then transmitted from an antenna 1016.

The modulated signals transmitted by the device 1002 (along with signals from other devices in communication with the device 1004) are received by an antenna 1018 of the device 1004. A receiver ("RCVR") 1020 processes (e.g., conditions and digitizes) the received signal from the antenna 1018 and provides received samples. A demodulator ("DEMOD") 1022 processes (e.g., demodulates and detects) the received samples and provides detected data symbols, which may be a noisy estimate of the data symbols transmitted to the device 1004 by the other device(s). A receive ("RX") data processor 1024 processes (e.g., symbol demaps, deinterleaves, and decodes) the detected data symbols and provides decoded data associated with each transmitting device (e.g., device 1002).

Components involved in sending information from the device 1004 to the device 1002 (e.g., a forward link) will be now be treated. At the device 1004, traffic data is processed by a transmit ("TX") data processor 1026 to generate data symbols. A modulator 1028 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1030 and transmitted from the antenna 1018. In some implementations signaling for the forward link may include power control commands and other information (e.g., relating to a communication channel) generated by a controller 1032 for all devices (e.g. terminals) transmitting on the reverse link to the device 1004.

At the device 1002, the modulated signal transmitted by the device 1004 is received by the antenna 1016, conditioned and digitized by a receiver ("RCVR") 1034, and processed by a demodulator ("DEMOD") 1036 to obtain detected data symbols. A receive ("RX") data processor 1038 processes the detected data symbols and provides decoded data for the device 1002 and the forward link signaling. A controller 1040 receives power control commands and other information to control data transmission and to control transmit power on the reverse link to the device 1004.

The controllers 1040 and 1032 direct various operations of the device 1002 and the device 1004, respectively. For example, a controller may determine an appropriate filter, reporting information about the filter, and decode information using a filter. Data memories 1042 and 1044 may store program codes and data used by the controllers 1040 and 1032, respectively.

FIG. 10 also illustrates that the communication components may include one or more components that perform operations relating to adaptive decisions as taught herein. For example, a RUM control component 1046 may cooperate with the controller 1040 and/or other components of the device 1002 to send and receive signals to another device (e.g., device 1004) as taught herein. Similarly, a RUM control component 1048 may cooperate with the controller 1032 and/or other components of the device 1004 to send and receive signals to another device (e.g., device 1002). It should be appreciated that for each device 1002 and 1004 the functionality of two or more of the described components may be provided by a single component. For example, a single processing component may provide the functionality of the RUM control component 1046 and the controller 1040 and a single processing component may provide the functionality of the RUM control component 1048 and the controller 1032.

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., messages relating to control and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data.

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 310 and 312 and receivers 314 and 316) that may include various components (e.g., signal generators and signal processors) that facilitate communication over a wireless medium.

Figure 11:
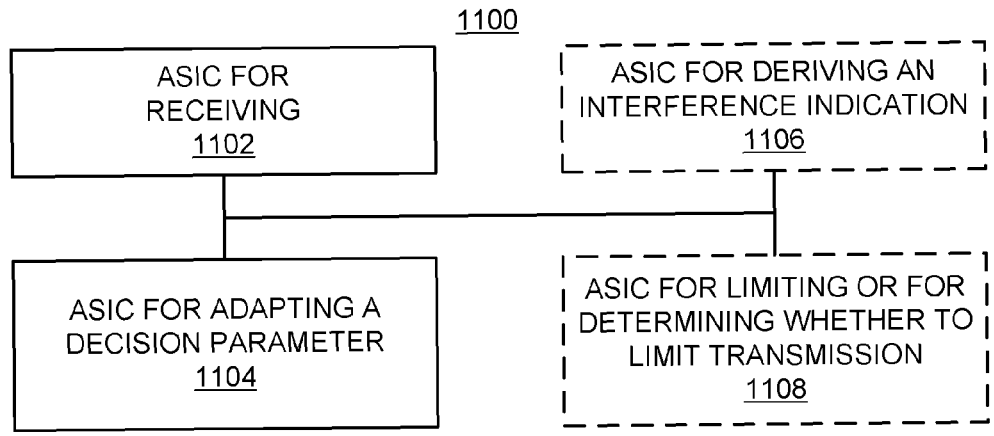
FIGS. 11-13 are simplified block diagrams of several sample aspects of apparatuses configured to provide functionality relating to adapting a transmission decision parameter as taught herein.
Figure 12:
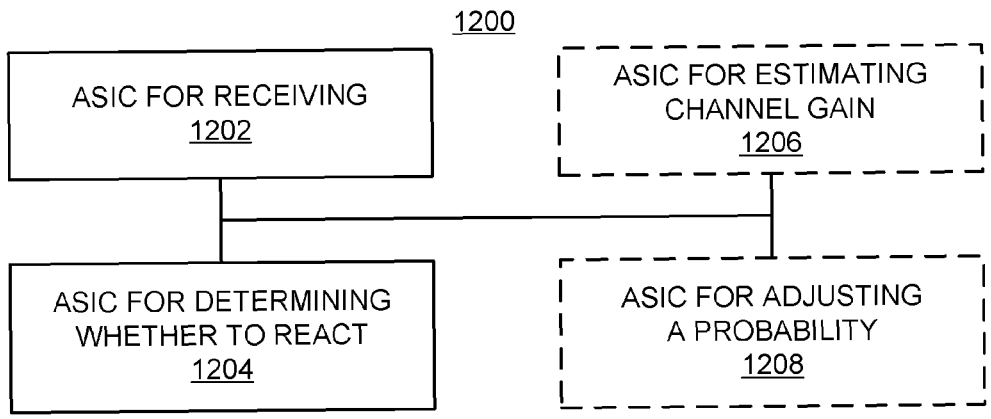
Figure 13:
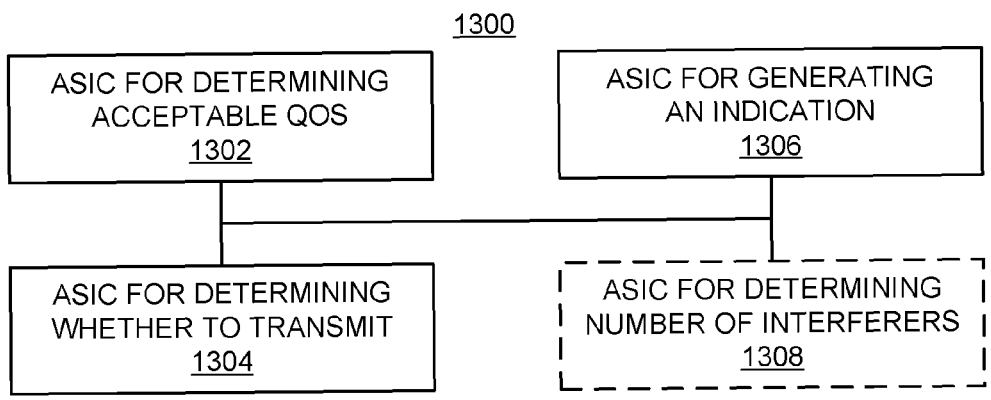

The components described herein may be implemented in a variety of ways. Referring to FIGS. 11-13, apparatuses 1100, 1200, and 1300 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof The apparatuses 1100, 1200, and 1300 may include one or more modules that may perform one or more of the functions described above with regard to various figures. For example, an ASIC for receiving 1102 or 1202 may correspond to, for example, a receiver as discussed herein. An ASIC for adapting a decision parameter 1104 may correspond to, for example, a decision parameter adapter as discussed herein. An ASIC for deriving an interference indication 1106 may correspond to, for example, a channel analyzer as discussed herein. An ASIC for limiting or for determining whether to limit transmission 1108 may correspond to, for example, a transmission controller as discussed herein. An ASIC for determining whether to react 1204 may correspond to, for example, a transmission controller as discussed herein. An ASIC for estimating channel gain 1206 may correspond to, for example, a channel analyzer as discussed herein. An ASIC for adapting a probability 1208 may correspond to, for example, a decision parameter adapter as discussed herein. An ASIC for determining acceptable QoS 1302 may correspond to, for example, a QoS determiner as discussed herein. An ASIC for determining whether to transmit 1304 may correspond to, for example, a RUM controller as discussed herein. An ASIC for generating an indication 1306 may correspond to, for example, a channel analyzer as discussed herein. An ASIC for determining the number of interferers 1308 may correspond to, for example, an interference determiner as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1100, 1200, and 1300 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 11-13 as well as other components and functions described herein, may be implemented using any suitable means. Such means also may be implemented, at least in part, using corresponding structure as taught herein. For example, the components described above in conjunction with the "ASIC for" components of FIGS. 11-13 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of mitigating interference in a wireless communication system, comprising:
   receiving at a wireless transmitting node a set of resource utilization messages from at least one wireless receiving node;
   adapting a resource utilization message rejection threshold based on the received set of resource utilization messages;
   deriving a value for comparing to the resource utilization message rejection threshold from an information from at least one received resource utilization message;
   comparing said value to said resource utilization message rejection threshold; and
   determining by the wireless transmitting node between reacting and not reacting to at least one received resource utilization message, based on said comparing.

2. The method of claim 1, wherein:
   the received set comprises a quantity of resource utilization messages received by the wireless transmitting node over a defined period of time; and
   wherein said adapting the resource utilization message rejection threshold is based, at least in part, on the quantity of received resource utilization messages.

3. The method of claim 2, wherein said adapting includes decreasing the resource utilization message rejection threshold if the quantity of received resource utilization messages is greater than or equal to a threshold quantity.

4. The method of claim 2, wherein said adapting includes increasing the resource utilization message rejection threshold if the quantity of received resource utilization messages is less than or equal to a threshold quantity.

5. The method of claim 1, wherein said adapting is based at least in part on a trend relating to how many resource utilization messages are received by the wireless transmitting node over time.

6. The method of claim 1, wherein:
   a set of priorities is associated with the received set of resource utilization messages; and
   wherein said adapting is based at least in part on the set of priorities.

7. The method of claim 6, wherein said adapting includes decreasing the resource utilization message rejection threshold if at least one priority of the set of priorities is greater than or equal to a threshold priority.

8. The method of claim 6, wherein said adapting includes increasing the resource utilization message rejection threshold if each priority of the set of priorities is less than or equal to a threshold priority.

9. The method of claim 1, wherein said adapting is based at least in part on a trend relating to how priority values associated with received resource utilization messages change over time.

10. The method of claim 1, wherein the set of resource utilization messages is received from a specified subset of a plurality of wireless receiving nodes.

11. The method of claim 1, wherein the set of resource utilization messages comprises a specified portion of a plurality of resource utilization messages received over a period of time.

12. The method of claim 11, wherein the specified portion comprises resource utilization messages having a highest priority.

13. The method of claim 1, wherein at least one resource utilization message received at the wireless transmitting node includes a maximum allowable level of interference at the wireless receiving node from which the received resource utilization message was received,
   wherein the information includes a power of the at least one resource utilization message as received at the wireless transmitting node,
   wherein said adapting includes adapting the resource utilization message rejection threshold based, at least in part, on said maximum allowable level of interference,
   wherein deriving the value comprises estimating an interference that would result at said wireless receiving node from a transmission by the wireless transmitting node, based at least in part on said information,
   wherein said comparing comprises comparing the estimated interference with said maximum allowable level of interference, and
   wherein the wireless transmitting node determining between reacting and not reacting includes determining whether to limit transmission by the wireless transmitting node is based, at least in part, on said comparing of the interference indication with the resource utilization message rejection threshold.

14. The method of claim 13, wherein:
   said estimating the interference indication that would result at said wireless receiving node from a transmission by the wireless transmitting node comprises determining a channel gain between a pair of nodes based, at least in part, on said power.

15. The method of claim 1, wherein the at least one received resource utilization message is at least one of the set of resource utilization messages.

16. The method of claim 1, wherein adapting a resource utilization message rejection threshold comprises obtaining from at least one of the received resource utilization messages a maximum allowable level of interference at the wireless receiving node sending the received resource utilization message to the wireless transmitting node, the method further comprising:

estimating an interference that would result at said wireless receiving node from a transmission by the wireless transmitting node, wherein the comparing includes comparing the estimated interference to the adapted decision parameter; and wherein the wireless transmitting node determining between reacting and not reacting includes determining, based on a result of the comparing, between ignoring the received resource utilization message and reacting to the received resource utilization message, wherein reacting to the received resource utilization message includes the wireless transmitting node limiting the transmission and ignoring the received resource utilization includes not limiting the transmission.

17. The method of claim 1, further comprising: receiving at least one other resource utilization message, wherein deriving a value for comparing to the resource utilization message rejection threshold comprises deriving the value from an information from the received at least one other resource utilization message.

18. A method of mitigating interference in wireless communication, comprising:

receiving at a wireless transmitting node a set of resource utilization messages from at least one wireless receiving node; and adapting, based on the received set of resource utilization messages, a decision parameter used by the wireless transmitting node to determine whether to react to at least one received resource utilization message, wherein the decision parameter comprises a probability of the wireless transmitting node reacting to the at least one received resource utilization message, and wherein the adaptation of the probability is further based on whether another wireless transmitting node limited transmission in response to at least one of the received set of resource utilization messages.

19. A method of mitigating interference in wireless communication, comprising:

receiving at a wireless transmitting node a set of resource utilization messages from at least one wireless receiving node; and adapting, based on the received set of resource utilization messages, a decision parameter used by the wireless transmitting node to determine whether to react to at least one received resource utilization message, wherein the decision parameter comprises a probability of the wireless transmitting node reacting to the at least one received resource utilization message, and wherein the adaptation of the probability comprises adjusting the probability in an inverse manner with respect to an increase or a decrease of a percentage of received resource utilization messages that caused the wireless transmitting node to limit transmission.

20. A method of mitigating interference in wireless communication, comprising:

receiving at a wireless transmitting node a set of resource utilization messages from at least one wireless receiving node; and adapting, based on the received set of resource utilization messages, a decision parameter used by the wireless transmitting node to determine whether to react to at least one received resource utilization message, wherein the decision parameter comprises a probability of the wireless transmitting node reacting to the at least one received resource utilization message, wherein the at least one received resource utilization message comprises a plurality of resource utilization messages, wherein a separate probability of the wireless transmitting node reacting is defined for each of the plurality of resource utilization messages, and wherein a determination of whether the wireless transmitting node reacts to a given one of the plurality of resource utilization messages is based on the probability of reacting defined for the given resource utilization message.

21. A method of mitigating interference in wireless communication, comprising:

receiving at a wireless transmitting node a set of resource utilization messages from at least one wireless receiving node; and adapting, based on the received set of resource utilization messages, a decision parameter used by the wireless transmitting node to determine whether to react to at least one received resource utilization message, wherein the decision parameter comprises a probability of the wireless transmitting node reacting to the at least one received resource utilization message, wherein the at least one received resource utilization message comprises a plurality of resource utilization messages, wherein a plurality of probabilities of the wireless transmitting node reacting are defined for the plurality of resource utilization messages, wherein at least one of the probabilities of the wireless transmitting node reacting is associated with a highest probability, and wherein a determination of whether the wireless transmitting node reacts to any one of the plurality of resource utilization messages is based on the highest probability.

22. An apparatus for wireless communication, comprising:
a receiver configured to receive a set of resource utilization messages; and
a decision parameter adapter configured to adapt a resource utilization message rejection threshold based on the received set of resource utilization messages;
a received resource utilization message analyzer configured to derive a value for comparing to the resource utilization message rejection threshold from an information from at least one received resource utilization message, and configured to compare said value to said resource utilization message rejection threshold; and
a transmission controller configured to determine whether to limit transmission based on comparing the value derived with the resource utilization message rejection threshold.

23. The apparatus of claim 22, wherein:
the received set comprises a quantity of resource utilization messages received over a defined period of time; and
the decision parameter adapter is further configured to adapt the resource utilization message rejection threshold based, at least in part, on the quantity of received resource utilization messages.

24. The apparatus of claim 23, wherein the decision parameter adapter is further configured to decrease the resource utilization message rejection threshold if the quantity of received resource utilization messages is greater than or equal to a threshold quantity.

25. The apparatus of claim 23, wherein the decision parameter adapter is further configured to increase the resource utilization message rejection threshold if the quantity of received resource utilization messages is less than or equal to a threshold quantity.

26. The apparatus of claim 22, wherein the decision parameter adapter is further configured to adapt the resource utilization message rejection threshold based, at least in part, on a trend relating to how many resource utilization messages are received over time.

27. The apparatus of claim 22, wherein:
a set of priorities is associated with the received set of resource utilization messages; and
the decision parameter adapter is further configured to adapt the resource utilization message rejection threshold based, at least in part, on the set of priorities.

28. The apparatus of claim 27, wherein the decision parameter adapter is further configured to decrease the resource utilization message rejection threshold if at least one priority of the set of priorities is greater than or equal to a threshold priority.

29. The apparatus of claim 27, wherein the decision parameter adapter is further configured to increase the resource utilization message rejection threshold if each priority of the set of priorities is less than or equal to a threshold priority.

30. The apparatus of claim 22, wherein the decision parameter adapter is further configured to adapt the resource utilization message rejection threshold based on a trend relating to how priority values associated with received resource utilization messages change over time.

31. The apparatus of claim 22, wherein the set of resource utilization messages is received from a specified subset of a plurality of nodes.

32. The apparatus of claim 22, wherein the set of resource utilization messages comprises a specified portion of a plurality of resource utilization messages received over a period of time.

33. The apparatus of claim 32, wherein the specified portion comprises resource utilization messages having a highest priority.

34. The apparatus of claim 22, further comprising:
a channel analyzer configured to derive an interference indication from the at least one received resource utilization message,
wherein the transmission controller is configured to determine whether to limit transmission based on comparison of the interference indication with the resource utilization message rejection threshold.

35. The apparatus of claim 34, wherein:
the derivation of the interference indication comprises determining a channel gain between a pair of nodes; and
the limiting of transmission comprises abstaining from transmitting, reducing transmit power, or transmitting on another resource.

36. The apparatus of claim 22, wherein the at least one received resource utilization message is at least one of the set of resource utilization messages.

37. The apparatus of claim 22, wherein the resource utilization message rejection threshold corresponds to a maximum allowable level of interference at a sending node associated with the received resource utilization message, and wherein the apparatus further comprises:
a channel analyzer configured to estimate an interference that would result at the node associated with the received resource utilization message from a transmission,
wherein the received resource utilization message analyzer is further configured to compare the channel analyzer's estimated interference to the resource utilization message rejection threshold, and wherein the transmission controller is further configured to determine whether to limit transmission based on said comparing the channel analyzer's estimated interference value with the resource utilization message rejection threshold.

38. The apparatus of claim 37, wherein reacting to the received resource utilization message includes limiting the transmission and ignoring the received resource utilization includes not limiting the transmission.

39. The apparatus of claim 22, wherein the at least one received resource utilization message is at least one of the set of resource utilization messages.

40. An apparatus for wireless communication, comprising:
a receiver configured to receive a set of resource utilization messages; and
a decision parameter adapter configured to adapt, based on the received set of resource utilization messages, a decision parameter for comparing to an information included in a resource utilization message to determine whether to react to at least one received resource utilization message,
wherein the decision parameter comprises a probability of reacting to the at least one received resource utilization message, and
wherein the decision parameter adapter is further configured to adapt the probability based on whether another wireless transmission node limited transmission in response to at least one of the received set of resource utilization messages.

41. An apparatus for wireless communication, comprising:
a receiver configured to receive a set of resource utilization messages; and
a decision parameter adapter configured to adapt, based on the received set of resource utilization messages, a decision parameter for comparing to an information included in a resource utilization message to determine whether to react to at least one received resource utilization message,
wherein the decision parameter comprises a probability of reacting to the at least one received resource utilization message, and
wherein the decision parameter adapter is further configured to adjust the probability in an inverse manner with respect to an increase or a decrease of a percentage of received resource utilization messages that caused a node to limit transmission.

42. An apparatus for wireless communication, comprising:
a receiver configured to receive a set of resource utilization messages; and
a decision parameter adapter configured to adapt, based on the received set of resource utilization messages, a decision parameter for comparing to an information included in a resource utilization message to determine whether to react to at least one received resource utilization message,
wherein the decision parameter comprises a probability of reacting to the at least one received resource utilization message,
wherein the at least one received resource utilization message comprises a plurality of resource utilization messages;
wherein a separate probability of reacting is defined for each of the plurality of resource utilization messages; and
wherein a determination of whether to react to a given one of the plurality of resource utilization messages is based on the probability of reacting defined for the given resource utilization message.

43. An apparatus for wireless communication, comprising:
a receiver configured to receive a set of resource utilization messages; and
a decision parameter adapter configured to adapt, based on the received set of resource utilization messages, a decision parameter for comparing to an information included in a resource utilization message to determine whether to react to at least one received resource utilization message,
wherein the decision parameter comprises a probability of reacting to the at least one received resource utilization message,
wherein the at least one received resource utilization message comprises a plurality of resource utilization messages,
wherein a plurality of probabilities of reacting are defined for the plurality of resource utilization messages,
wherein at least one of the probabilities of reacting is associated with a highest probability, and
wherein a determination of whether to react to any one of the plurality of resource utilization messages is based on the highest probability.

44. An apparatus for wireless communication, comprising:
means for receiving a set of resource utilization messages; and
means for adapting a resource utilization message rejection threshold based on the received set of resource utilization messages;
means for deriving a value for comparing to the resource utilization message rejection threshold from an information from at least one received resource utilization message;
means for comparing said value to said resource utilization message rejection threshold; and
means for determining between reacting and not reacting to at least one received resource utilization message, based on said comparing.

45. The apparatus of claim 44, wherein:
the received set comprises a quantity of resource utilization messages received over a defined period of time; and
the means for adapting further adapts the resource utilization message rejection threshold based, at least in part, on the quantity of received resource utilization messages.

46. The apparatus of claim 45, wherein the means for adapting decreases the resource utilization message rejection threshold if the quantity of received resource utilization messages is greater than or equal to a threshold quantity.

47. The apparatus of claim 45, wherein the means for adapting increases the resource utilization message rejection if the quantity of received resource utilization messages is less than or equal to a threshold quantity.

48. The apparatus of claim 44, wherein the means for adapting further adapts the resource utilization message rejection threshold based on a trend relating to how many resource utilization messages are received over time.

49. The apparatus of claim 44, wherein:
a set of priorities is associated with the received set of resource utilization messages; and
the means for adapting further adapts the resource utilization message rejection threshold based on the set of priorities.

50. The apparatus of claim 49, wherein the means for adapting decreases the resource utilization message rejection threshold if at least one priority of the set of priorities is greater than or equal to a threshold priority.

51. The apparatus of claim 49, wherein the means for adapting increases the resource utilization message rejection threshold if each priority of the set of priorities is less than or equal to a threshold priority.

52. The apparatus of claim 44, wherein the means for adapting further adapts the resource utilization message rejection threshold based on a trend relating to how priority values associated with received resource utilization messages change over time.

53. The apparatus of claim 44, wherein the set of resource utilization messages is received from a specified subset of a plurality of nodes.

54. The apparatus of claim 44, wherein the set of resource utilization messages comprises a specified portion of a plurality of resource utilization messages received over a period of time.

55. The apparatus of claim 54, wherein the specified portion comprises resource utilization messages having a highest priority.

56. The apparatus of claim 44, further comprising:
means for deriving an interference indication from the at least one received resource utilization message; and
means for determining whether to limit transmission based on comparison of the interference indication with the resource utilization message rejection threshold.

57. The apparatus of claim 56, wherein:
the derivation of the interference indication comprises determining a channel gain between a pair of nodes; and
the limiting of transmission comprises abstaining from transmitting, reducing transmit power, or transmitting on another resource.

58. The apparatus of claim 44, wherein the at least one received resource utilization message is at least one of the set of resource utilization messages.

59. The apparatus of claim 44, wherein the resource utilization message rejection threshold corresponds to a maximum allowable level of interference at a sending node associated with the received resource utilization message, and wherein the apparatus further comprises:
means for estimating an interference that would result at the sending node from a transmission;
means for comparing the estimated interference to the adapted decision parameter, and to determine, based on a result of the comparing, between ignoring the received resource utilization message and reacting to the received resource utilization message,
wherein reacting to the received resource utilization message includes limiting the transmission, and ignoring the received resource utilization includes not limiting the transmission.

60. The apparatus of claim 44, wherein the at least one received resource utilization message is at least one other received resource utilization message.

61. An apparatus for wireless communication, comprising:
means for receiving a set of resource utilization messages; and
means for adapting, based on the received set of resource utilization messages, a decision parameter for comparing to an information in a received resource utilization message to determine whether to react to at least one received resource utilization message,
wherein the decision parameter comprises a probability of reacting to the at least one received resource utilization message, and wherein the means for adapting further adapts the probability based on whether another wireless transmission node limited transmission in response to at least one of the received set of resource utilization messages.

62. An apparatus for wireless communication, comprising:
 means for receiving a set of resource utilization messages; and
 means for adapting, based on the received set of resource utilization messages, a decision parameter for comparing to an information in a received resource utilization message to determine whether to react to at least one received resource utilization message,
 wherein the decision parameter comprises a probability of reacting to the at least one received resource utilization message, and
 wherein the means for adapting adjusts the probability in an inverse manner with respect to an increase or a decrease of a percentage of received resource utilization messages that caused a node to limit transmission.

63. An apparatus for wireless communication, comprising:
 means for receiving a set of resource utilization messages; and
 means for adapting, based on the received set of resource utilization messages, a decision parameter for comparing to an information in a received resource utilization message to determine whether to react to at least one received resource utilization message,
 wherein the decision parameter comprises a probability of reacting to the at least one received resource utilization message,
 wherein the at least one received resource utilization message comprises a plurality of resource utilization messages,
 wherein a separate probability of reacting is defined for each of the plurality of resource utilization messages, and
 wherein a determination of whether to react to a given one of the plurality of resource utilization messages is based on the probability of reacting defined for the given resource utilization message.

64. An apparatus for wireless communication, comprising:
 means for receiving a set of resource utilization messages; and
 means for adapting, based on the received set of resource utilization messages, a decision parameter for comparing to an information in a received resource utilization message to determine whether to react to at least one received resource utilization message,
 wherein the decision parameter comprises a probability of reacting to the at least one received resource utilization message,
 wherein the at least one received resource utilization message comprises a plurality of resource utilization messages,
 wherein a plurality of probabilities of reacting are defined for the plurality of resource utilization messages,
 wherein at least one of the probabilities of reacting is associated with a highest probability, and
 wherein a determination of whether to react to any one of the plurality of resource utilization messages is based on the highest probability.

65. A non-transitory computer-readable medium encoded with computer executable instructions comprising:
 instructions for receiving a set of resource utilization messages from at least one wireless receiving node;
 instructions for adapting a resource utilization message rejection threshold based on the received set of resource utilization messages;
 instructions for deriving a value for comparing to the resource utilization message rejection threshold from an information from at least one received resource utilization message;
 instructions for comparing said value to said resource utilization message rejection threshold; and
 instructions for determining between reacting and not reacting to at least one received resource utilization message, based on said comparing.

66. The non-transitory computer-readable medium of claim 65, wherein adapting a resource utilization message rejection threshold comprises adapting the resource utilization message rejection threshold to correspond to a maximum allowable level of interference at a sending node associated with the received resource utilization message, and wherein the non-transitory computer-readable medium is encoded with further computer executable instructions, comprising:
 instructions for estimating an interference that would result at the sending node from a transmission;
 instructions for comparing the estimated interference to the adapted resource utilization message rejection threshold; and
 instructions for determining, based on a result of the comparing, between ignoring the received resource utilization message and reacting to the received resource utilization message,
 wherein reacting to the received resource utilization includes limiting the transmission, and ignoring the received resource utilization message includes not limiting the transmission.

67. An access point, comprising:
 an antenna;
 a receiver configured to receive a set of resource utilization messages via the antenna;
 a decision parameter adapter configured to adapt a resource utilization message rejection threshold based on the received set of resource utilization messages;
 a received resource utilization message analyzer configured to derive a value for comparing to the resource utilization message rejection threshold from an information from at least one received resource utilization message, and configured to compare said value to said resource utilization message rejection threshold; and
 a transmission controller configured to determine whether to limit transmission based on comparing the value derived with the resource utilization message rejection threshold.

68. The access point of claim 67, wherein the resource utilization message rejection threshold corresponds to a maximum allowable level of interference at a sending node associated with the received resource utilization message, and wherein the apparatus further comprises:
 a channel analyzer configured to estimate an interference that would result at the node associated with the received resource utilization message from a transmission;
 wherein the decision parameter adapter configured to adapt the resource utilization message rejection threshold based on an information in at least one received resource utilization message indicating the maximum allowable level of interference, and wherein
 the received resource utilization message analyzer is further configured to compare the channel analyzer's estimated interference to the resource utilization message rejection threshold.

69. The access point of claim 68, wherein reacting to the received resource utilization message includes limiting the transmission and ignoring the received resource utilization includes not limiting the transmission.

70. An access terminal, comprising:
a receiver configured to receive a set of resource utilization messages;
a decision parameter adapter configured to adapt a resource utilization message rejection threshold based on the received set of resource utilization messages;
a received resource utilization message analyzer configured to derive a value for comparing to the resource utilization message rejection threshold from an information from at least one received resource utilization message, and configured to compare said value to said resource utilization message rejection threshold;
a transmission controller configured to determine whether to limit transmission based on comparing the value derived with the resource utilization message rejection threshold; and a user interface configured to output an indication based on data received via the receiver.

71. The access terminal of claim 70, wherein the resource utilization message rejection threshold corresponds to a maximum allowable level of interference at a sending node associated with the received resource utilization message, and wherein the apparatus further comprises:
a channel analyzer configured to estimate an interference that would result at the node associated with the received resource utilization message from a transmission,
wherein the decision parameter adapter configured to adapt the resource utilization message rejection threshold based on an information in at least one received resource utilization message indicating the maximum allowable level of interference, and wherein
the received resource utilization message analyzer is further configured to compare the channel analyzer's estimated interference to the resource utilization message rejection threshold.

72. The access terminal of claim 71, wherein reacting to the received resource utilization message includes limiting the transmission and ignoring the received resource utilization includes not limiting the transmission.

73. A method of mitigating interference in wireless communication, comprising:
receiving at a wireless transmitting node a set of resource utilization messages from at least one wireless receiving node; and
adapting, based on the received set of resource utilization messages, a decision parameter used by the wireless transmitting node to determine whether to react to at least one received resource utilization message, wherein the decision parameter comprises a probability of the wireless transmitting node reacting to the at least one received resource utilization message;
probabilistic reacting to a received resource utilization message according to the probability associated with the decision parameter, wherein said probabilistic reacting includes:
generating a random number;
comparing the random number to the adapted decision parameter; and
electing, based on a result of the comparing, between reacting and not reacting to the received resource utilization message.

74. An apparatus for wireless communication, further comprising:
a receiver configured to receive a set of resource utilization messages;
a decision parameter adapter configured to adapt, based on the received set of resource utilization messages, a decision parameter for comparing to an information included in a resource utilization message to determine whether to react to at least one received resource utilization message, wherein the decision parameter comprises a probability of reacting to the at least one received resource utilization message; and
a transmission controller configured to control a transmission according to the probability associated with the decision parameter, wherein the transmission controller is further configured to:
generate a random number;
compare the random number to the adapted decision parameter; and
elect, based on a result of the comparing, between reacting to the received resource utilization message, by limiting a transmission, and not reacting to the received resource utilization message, by not limiting the transmission.

75. An apparatus for wireless communication comprising:
means for receiving a set of resource utilization messages; and
means for adapting, based on the received set of resource utilization messages, a decision parameter for comparing to an information in a received resource utilization message to determine whether to react to at least one received resource utilization message, wherein the decision parameter comprises a probability of reacting to the at least one received resource utilization messages; and
means for controlling a transmission according to the probability associated with the decision parameter, wherein controlling the transmission includes:
generating a random number;
comparing the random number to the adapted decision parameter; and
electing, based on a result of the comparing, between limiting the transmission and not limiting the transmission.

76. A non-transitory computer-readable medium encoded with computer executable instructions comprising instructions, comprising:
instructions for receiving a set of resource utilization messages; and
instructions for adapting, based on the received set of resource utilization messages, a decision parameter used to determine whether to react to at least one received resource utilization message, wherein the decision parameter comprises a probability of reacting to the at least one received resource utilization message;
instructions for reacting to the at least one received resource utilization message according to the probability associated with the decision parameter, wherein the instructions for reacting include:
instructions for generating a random number;
instructions for comparing the random number to the adapted decision parameter; and
instructions for electing, based on a result of the comparing, between limiting the transmission and not limiting the transmission.

* * * * *